(12) United States Patent
Gunn

(10) Patent No.: US 9,661,841 B2
(45) Date of Patent: May 30, 2017

(54) SYSTEMS AND METHODS FOR PROVIDING MOTION IN ANIMAL DECOYS

(71) Applicant: Motion Madness Decoys, LLC, Fenton, MO (US)

(72) Inventor: Randall Robert Gunn, Fenton, MO (US)

(73) Assignee: Motion Madness Decoys, LLC, Fenton, MO (US)

( * ) Notice: Subject to any disclaimer, the term of this patent is extended or adjusted under 35 U.S.C. 154(b) by 286 days.

(21) Appl. No.: 14/686,447

(22) Filed: Apr. 14, 2015

(65) Prior Publication Data

US 2015/0323123 A1 Nov. 12, 2015

Related U.S. Application Data

(60) Provisional application No. 61/990,377, filed on May 8, 2014, provisional application No. 62/133,397, filed on Mar. 15, 2015.

(51) Int. Cl.
| | | |
|---|---|---|
| *A01M 31/06* | (2006.01) | |
| *F16M 11/18* | (2006.01) | |
| *A01M 99/00* | (2006.01) | |
| *F16M 11/04* | (2006.01) | |

(52) U.S. Cl.
CPC ............ *A01M 31/06* (2013.01); *A01M 99/00* (2013.01); *F16M 11/04* (2013.01); *F16M 11/18* (2013.01)

(58) Field of Classification Search
USPC .......................................................... 43/2, 3
See application file for complete search history.

(56) References Cited

U.S. PATENT DOCUMENTS

| | | | | |
|---|---|---|---|---|
| 2,480,390 | A * | 8/1949 | Thompson | A01M 31/06 43/3 |
| 3,220,253 | A * | 11/1965 | Parker | G01P 5/06 446/199 |
| 3,916,553 | A * | 11/1975 | Lynch | A01M 31/06 43/3 |
| 4,896,448 | A * | 1/1990 | Jackson | A01M 31/06 43/3 |
| 5,960,577 | A | 10/1999 | Walterson | |
| 6,339,894 | B1 | 1/2002 | Solomon | |
| 6,360,474 | B1 * | 3/2002 | Wurlitzer | A01M 31/06 40/417 |
| 6,408,559 | B2 | 6/2002 | Mathews | |
| 6,460,284 | B1 | 10/2002 | Rabo | |
| 6,508,028 | B1 | 1/2003 | Crowe | |
| 6,574,903 | B2 | 6/2003 | Solomon | |
| 6,684,552 | B1 * | 2/2004 | Anders, III | A01M 31/04 43/2 |

(Continued)

*Primary Examiner* — Christopher P Ellis
(74) *Attorney, Agent, or Firm* — Harness, Dickey & Pierce, P.L.C.

(57) ABSTRACT

Disclosed are exemplary embodiments of mechanical assemblies or systems that may be used to create or provide various motions in animal decoys, such as in a decoy of a duck, goose, turkey, deer, dove, crow, coyote, among other types of birds, mammals, etc. For example, a mechanical assembly or system disclosed herein may be used to create or provide sweeping (e.g., rotation left-to-right and right-to-left, etc.) motions and/or peck (e.g., pivoting up-and-down, etc.) feeding motions for wild bird decoys (e.g., ducks, geese, dove, crow, drake, etc.).

18 Claims, 28 Drawing Sheets

(56) References Cited

U.S. PATENT DOCUMENTS

| | | | |
|---|---|---|---|
| 6,840,477 B2* | 1/2005 | Hamamoto | B64C 33/02 244/22 |
| 7,117,628 B1 | 10/2006 | Bailey | |
| 7,225,579 B2* | 6/2007 | Haley | A01M 31/06 43/3 |
| 7,651,051 B2* | 1/2010 | Agrawal | B64C 33/02 244/22 |
| 9,101,128 B2* | 8/2015 | Barley | A01M 31/06 |
| 2002/0162268 A1 | 11/2002 | Fulcher | |
| 2004/0194365 A1 | 10/2004 | Summers et al. | |
| 2004/0211106 A1 | 10/2004 | Solomon | |
| 2005/0144828 A1 | 7/2005 | Lewis et al. | |
| 2011/0088307 A1 | 4/2011 | Rice | |
| 2013/0239454 A1 | 9/2013 | Szechenyi et al. | |

* cited by examiner

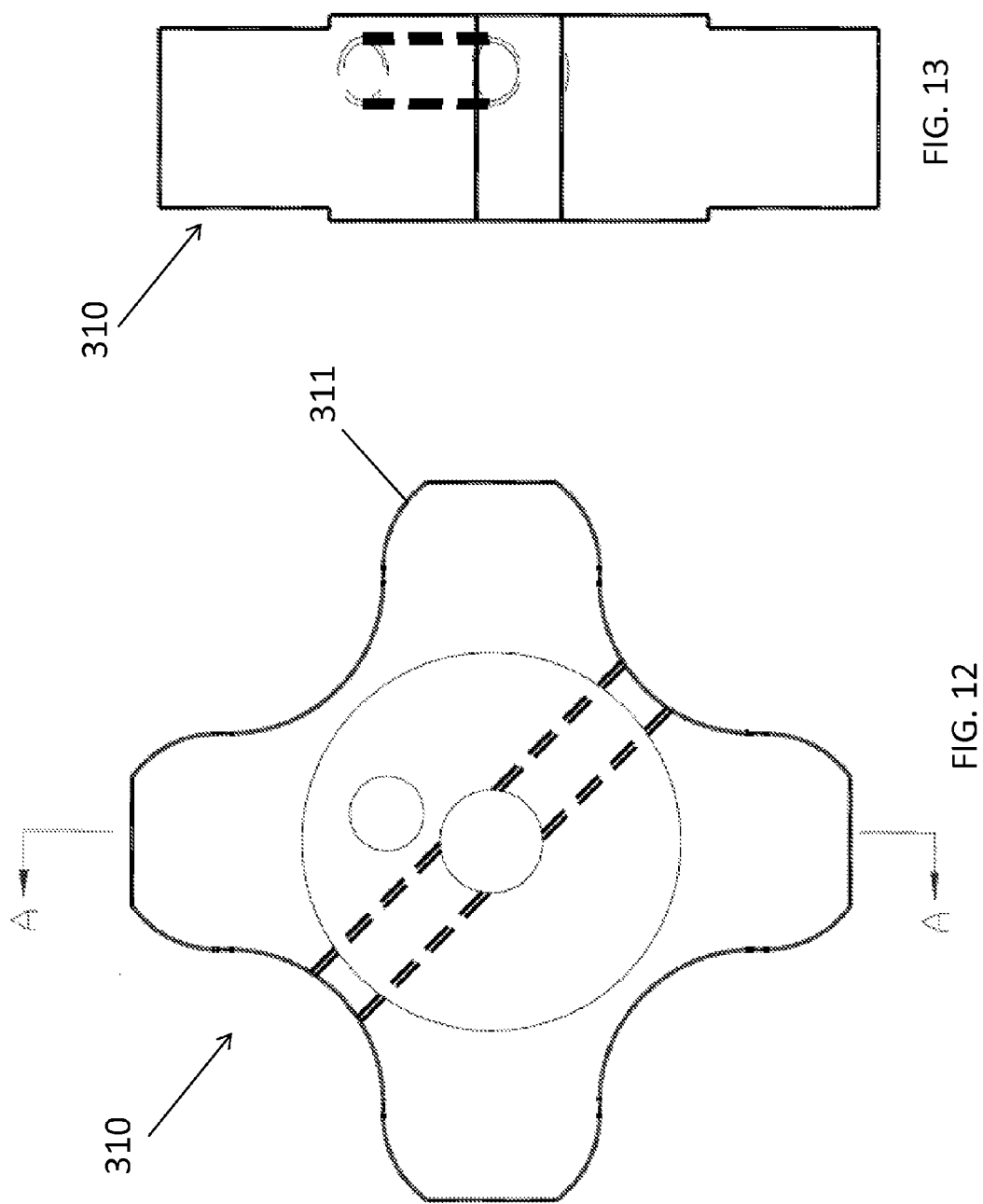

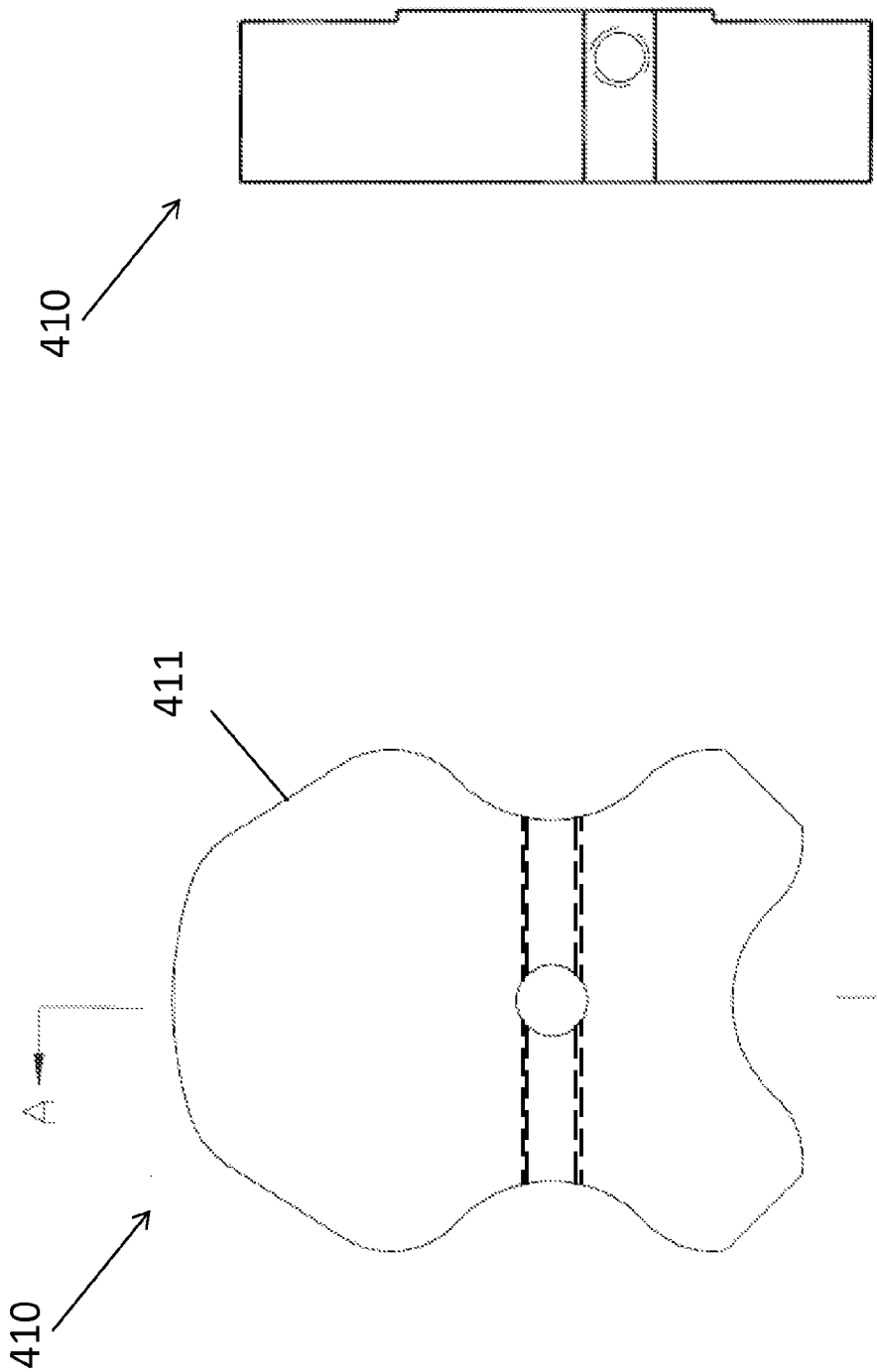

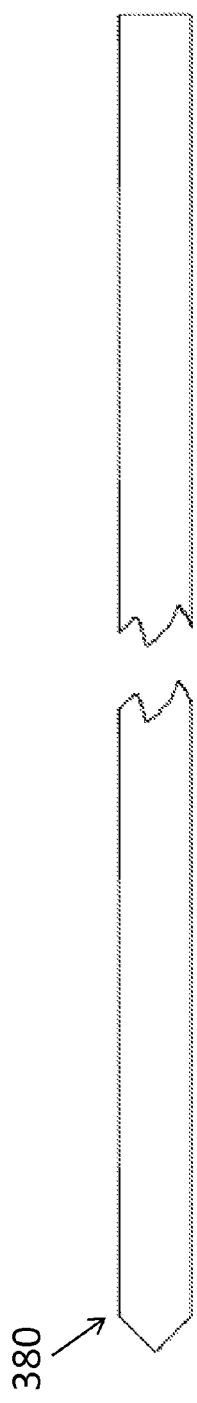
FIG. 16
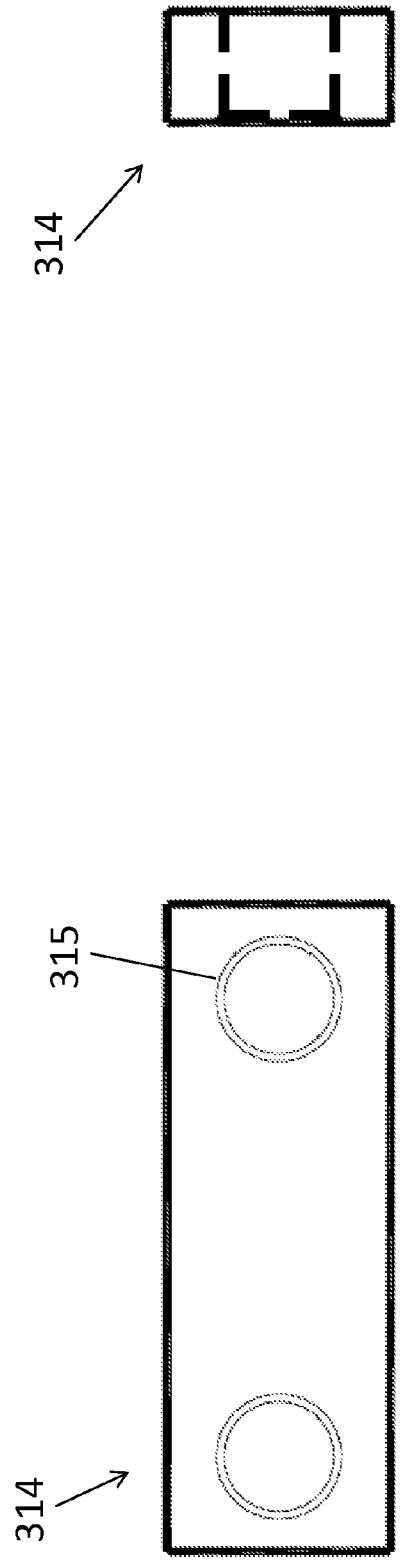
FIG. 18
FIG. 17

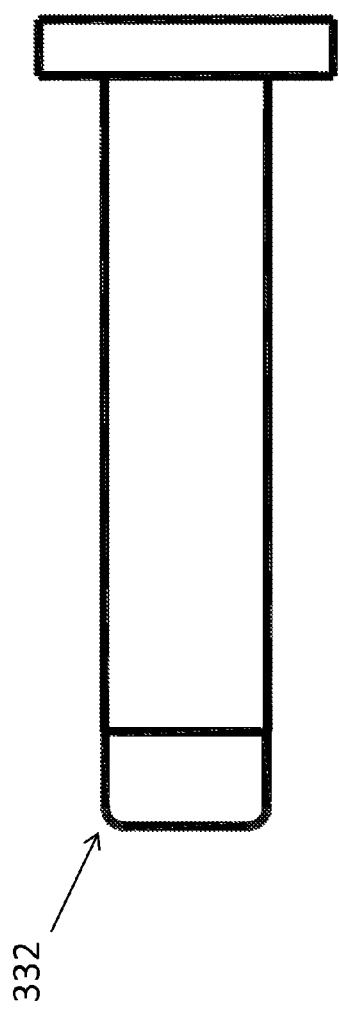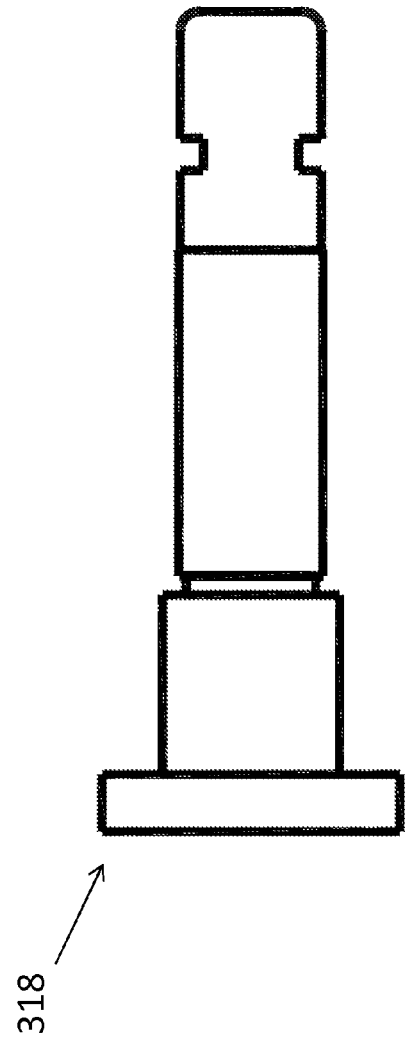

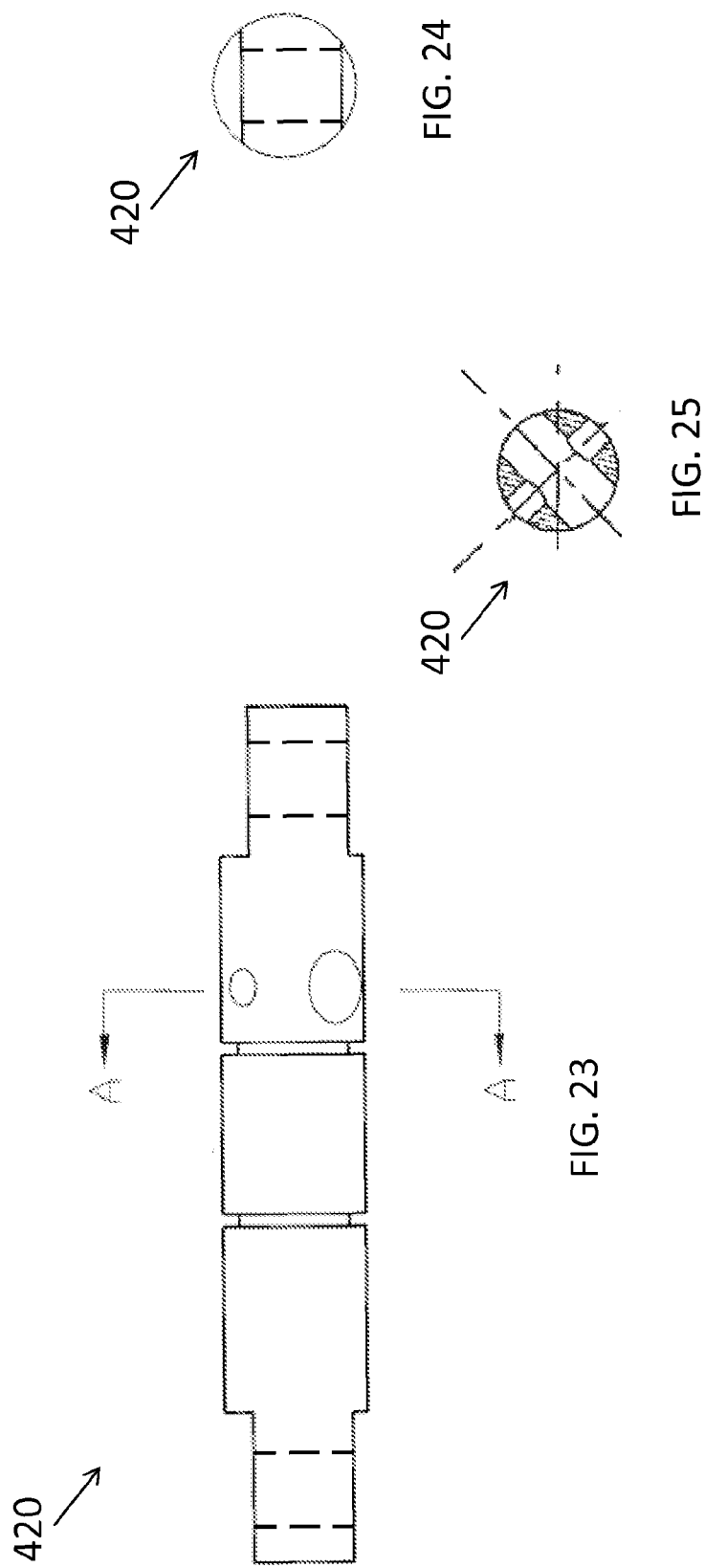

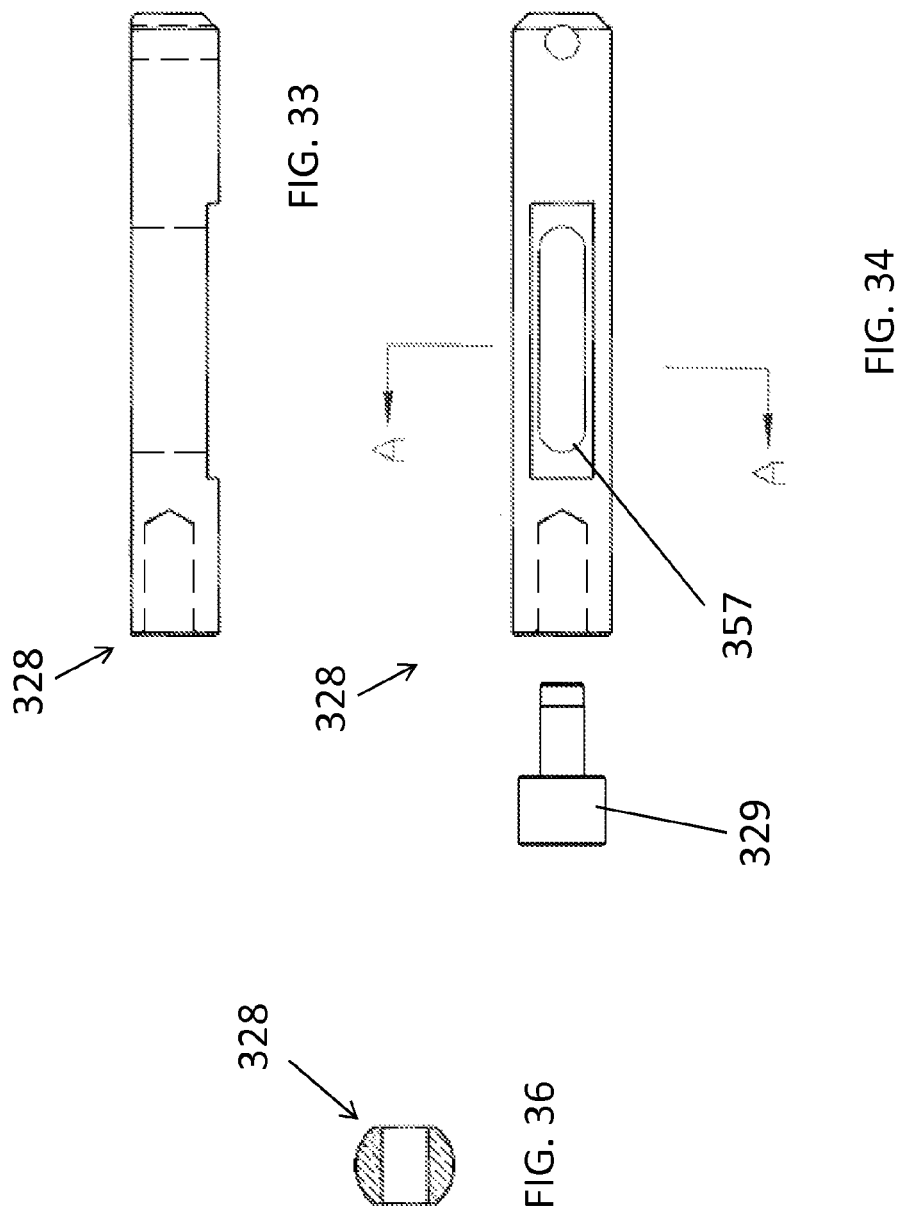

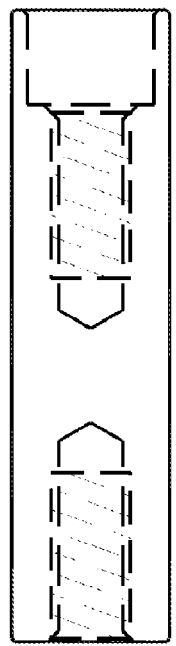
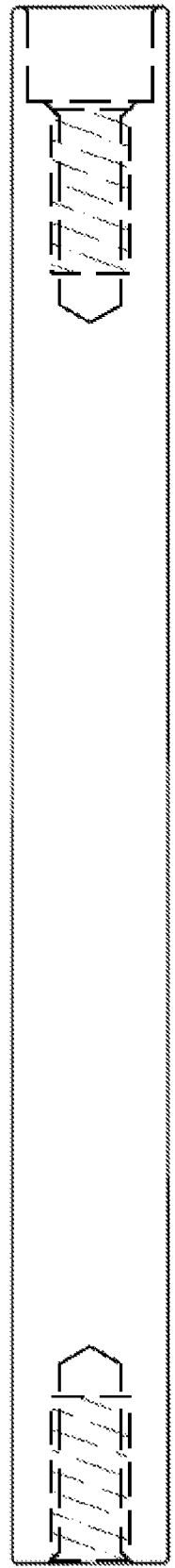
FIG. 39
FIG. 40

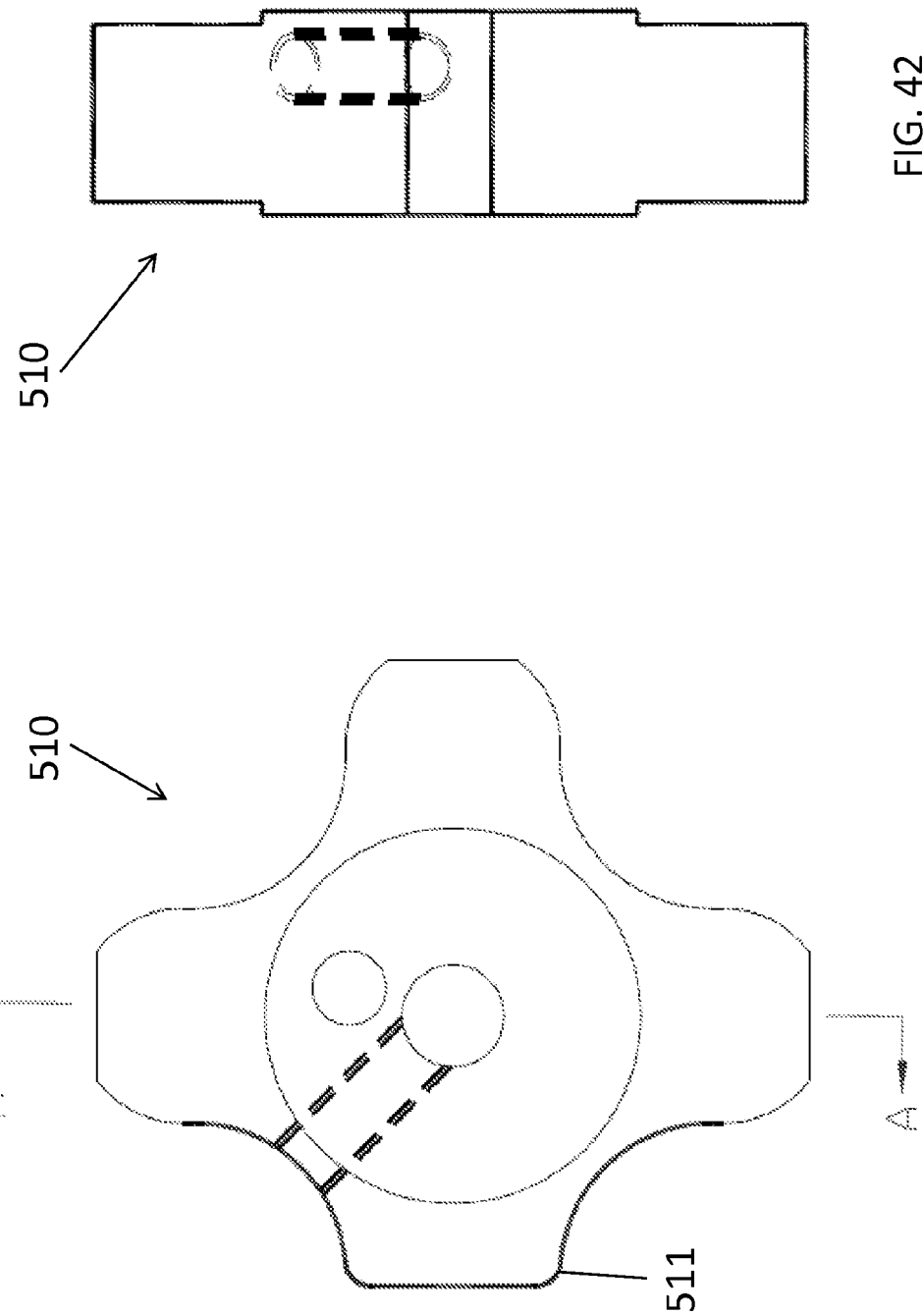

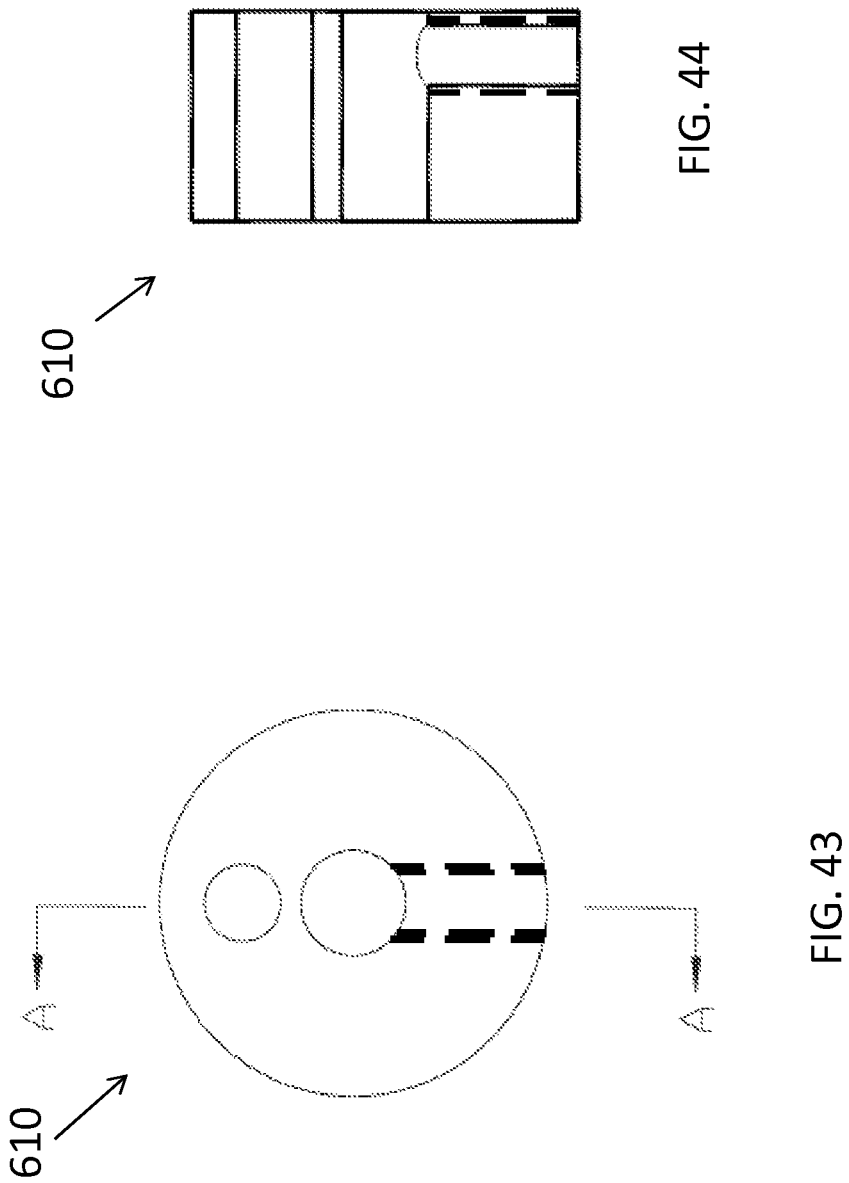

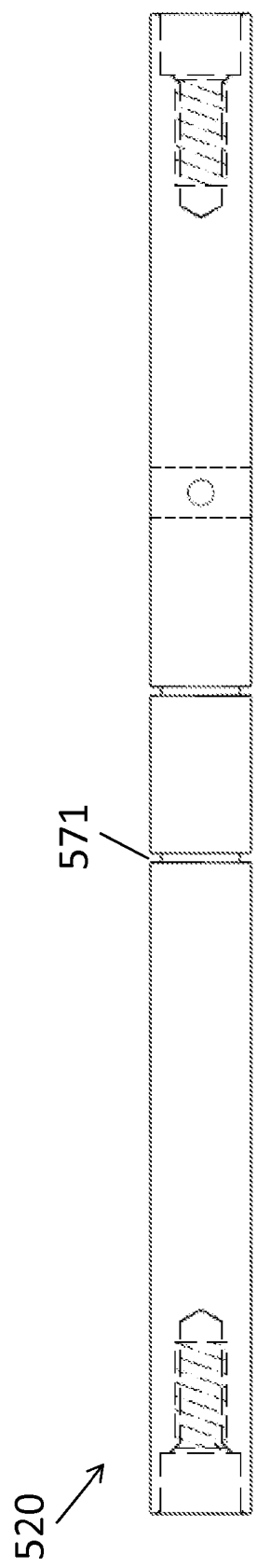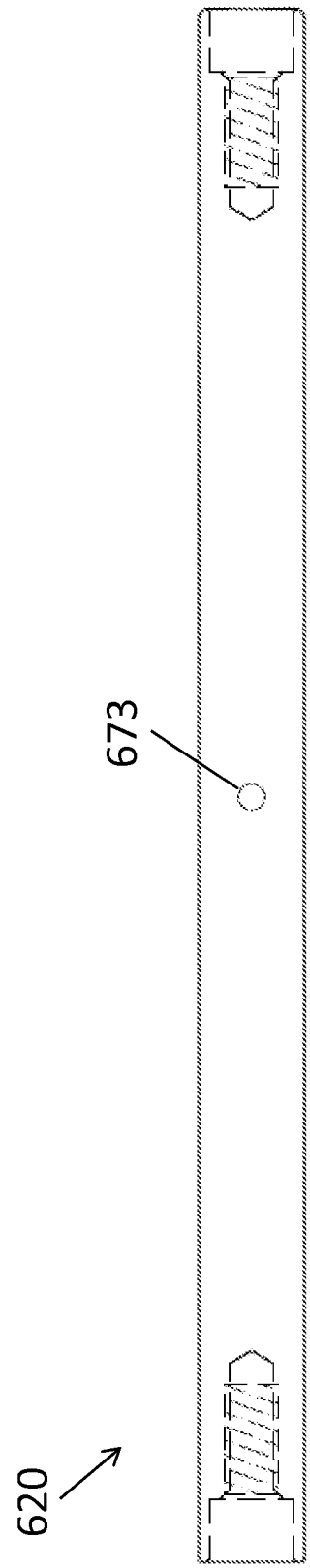
FIG. 46
FIG. 47

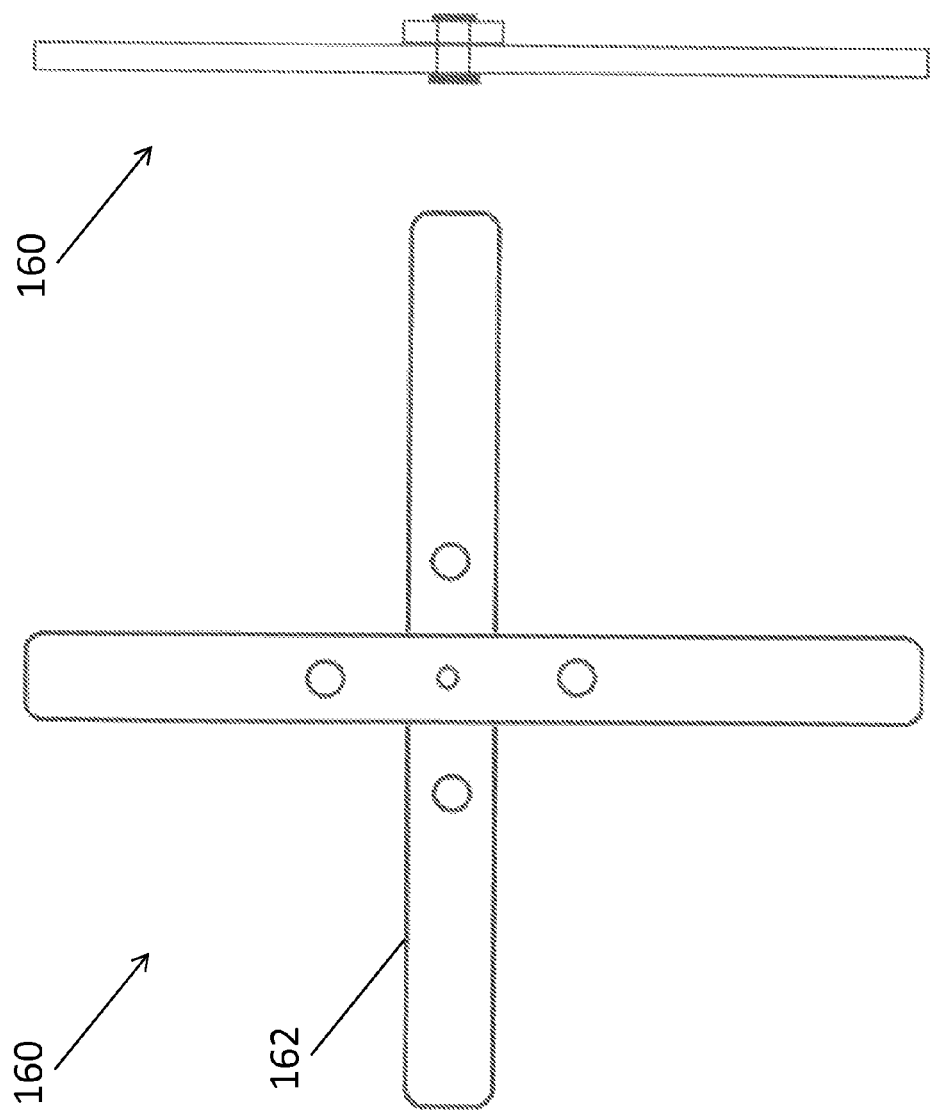

and start intervals according to an exemplary embodiment;

SYSTEMS AND METHODS FOR PROVIDING MOTION IN ANIMAL DECOYS

CROSS-REFERENCE TO RELATED APPLICATIONS

This patent application claims the benefit of and priority to U.S. Provisional Patent Application No. 61/990,377 filed May 8, 2014 and U.S. Provisional Patent Application 62/133,397 filed Mar. 15, 2015. The entire disclosures of the above applications are incorporated herein by reference.

FIELD

The present disclosure relates to systems and methods for providing motion in animal decoys.

BACKGROUND

This section provides background information related to the present disclosure which is not necessarily prior art.

Conventional decoys do not have a natural appearance in terms of natural motion. Conventional decoys also have very little or limited available movements/motions or options. Some conventional decoys rely solely on the wind to produce movement, such as rotating or spinning wings. But these items do not appear real and have very limited effect during use. The conventional decoys are also not modifiable and do not have interchangeable components to adapt to the desired motions of a different species or situation in which they are used.

SUMMARY

This section provides a general summary of the disclosure, and is not a comprehensive disclosure of its full scope or all of its features.

According to various aspects, exemplary embodiments are disclosed of mechanical assemblies or systems that may be used to create or provide various motions in animal decoys, such as in a decoy of a duck, goose, turkey, deer, dove, crow, coyote, among other types of birds, mammals, etc. For example, a mechanical assembly or system disclosed herein may be used to provide or create sweeping (e.g., rotation left-to-right and right-to-left, etc.) motions and/or peck (e.g., pivoting up-and-down, etc.) feeding motions for wild bird decoys (e.g., ducks, geese, dove, crow, drake, etc.).

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
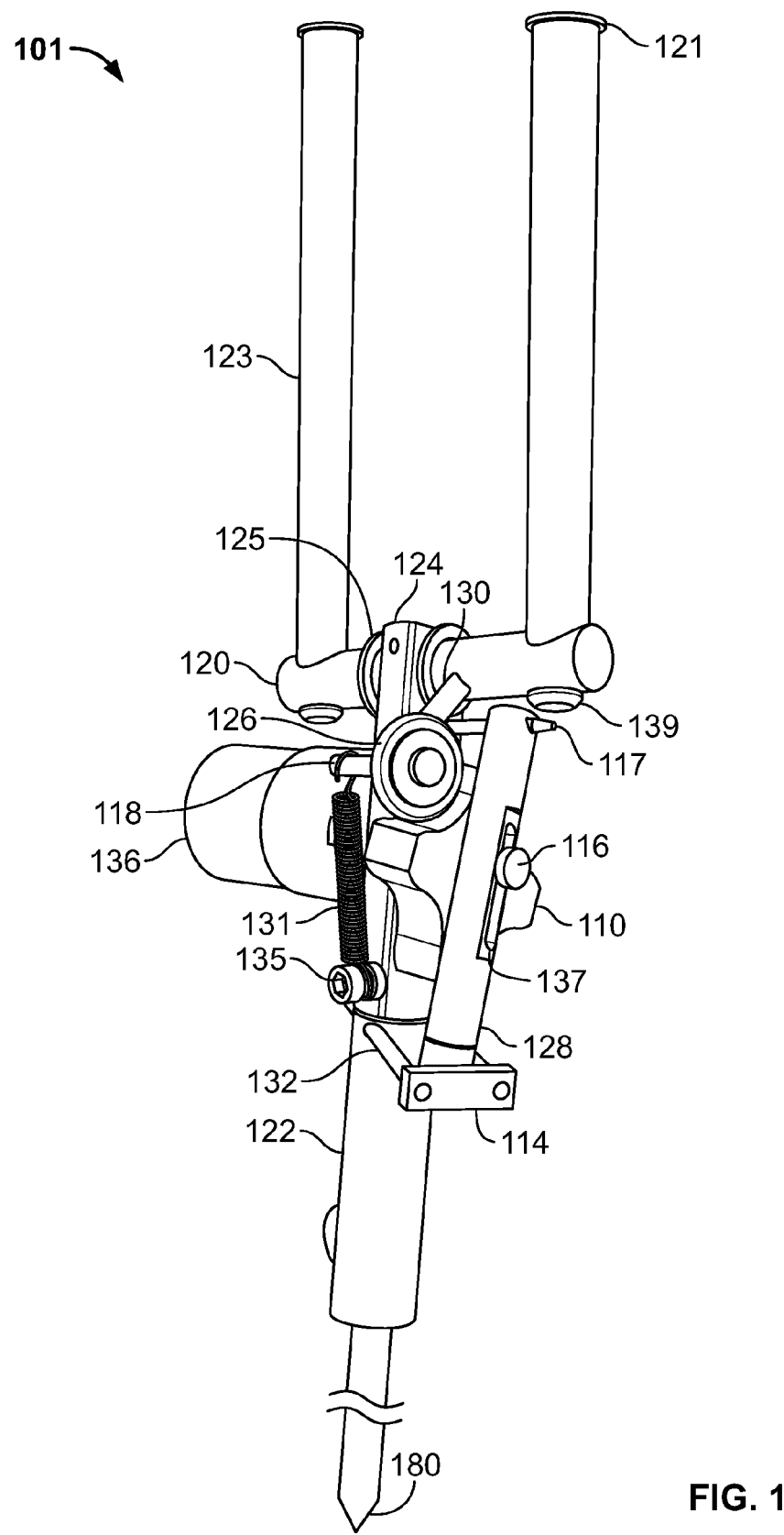
FIG. 1 is a perspective view of a mechanical assembly or system that may be used for providing motion in an animal decoy according to an exemplary embodiment in which the system includes a cam with four spaced-apart lobes or camming surfaces, whereby the system is operable for producing a sweeping motion and a peck feeding motion for a decoy.
Figure 2:
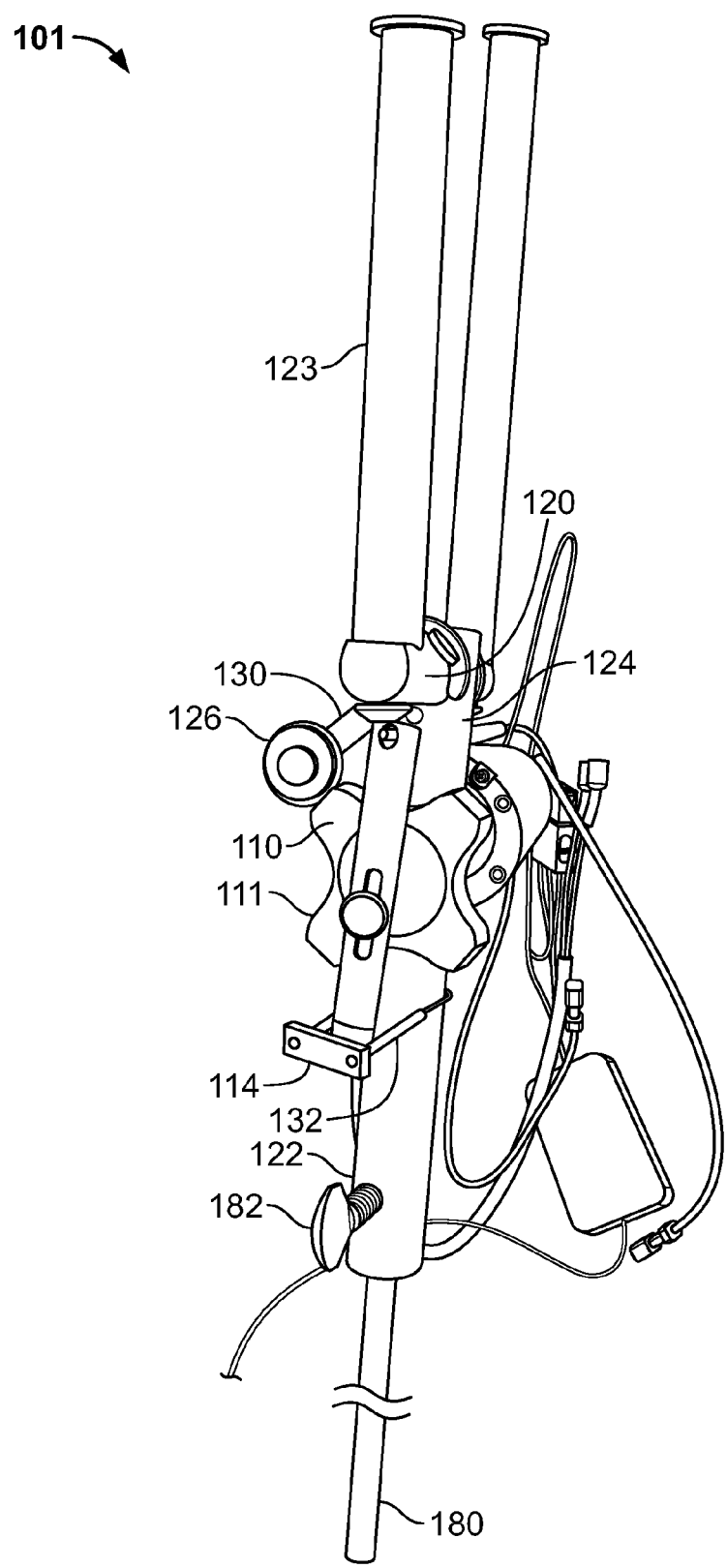
FIG. 2 is another perspective view of the mechanical assembly or system shown in FIG. 1.
Figure 4:
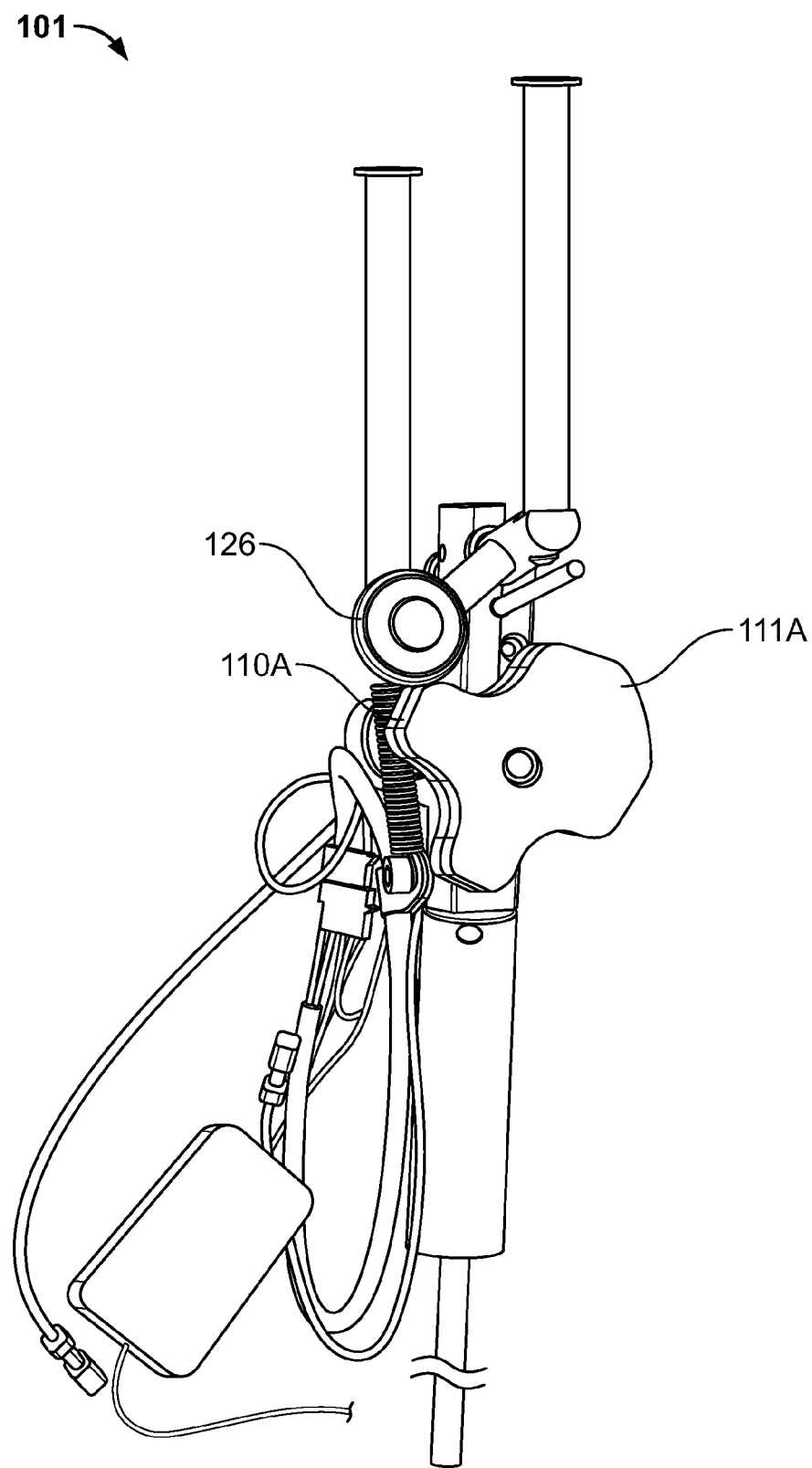
Figure 5:
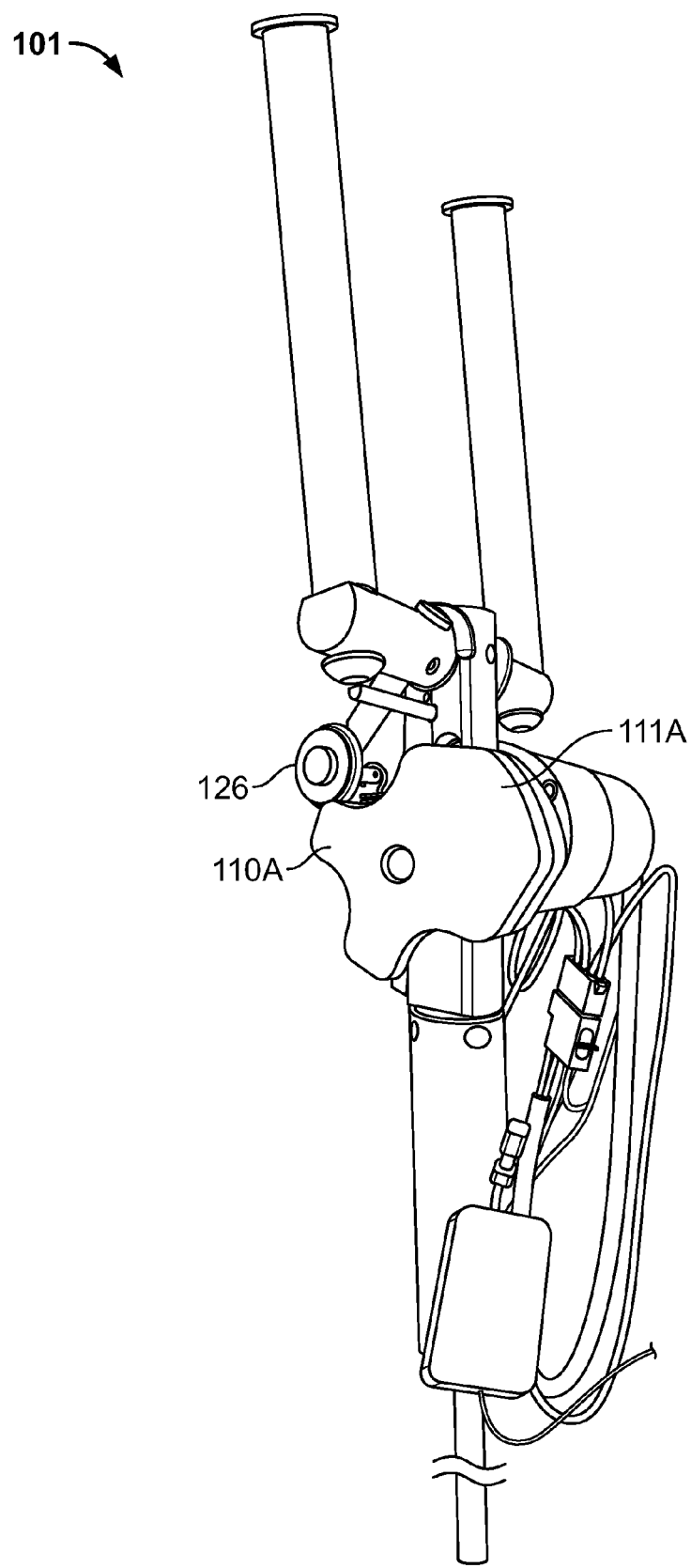
Figure 6:
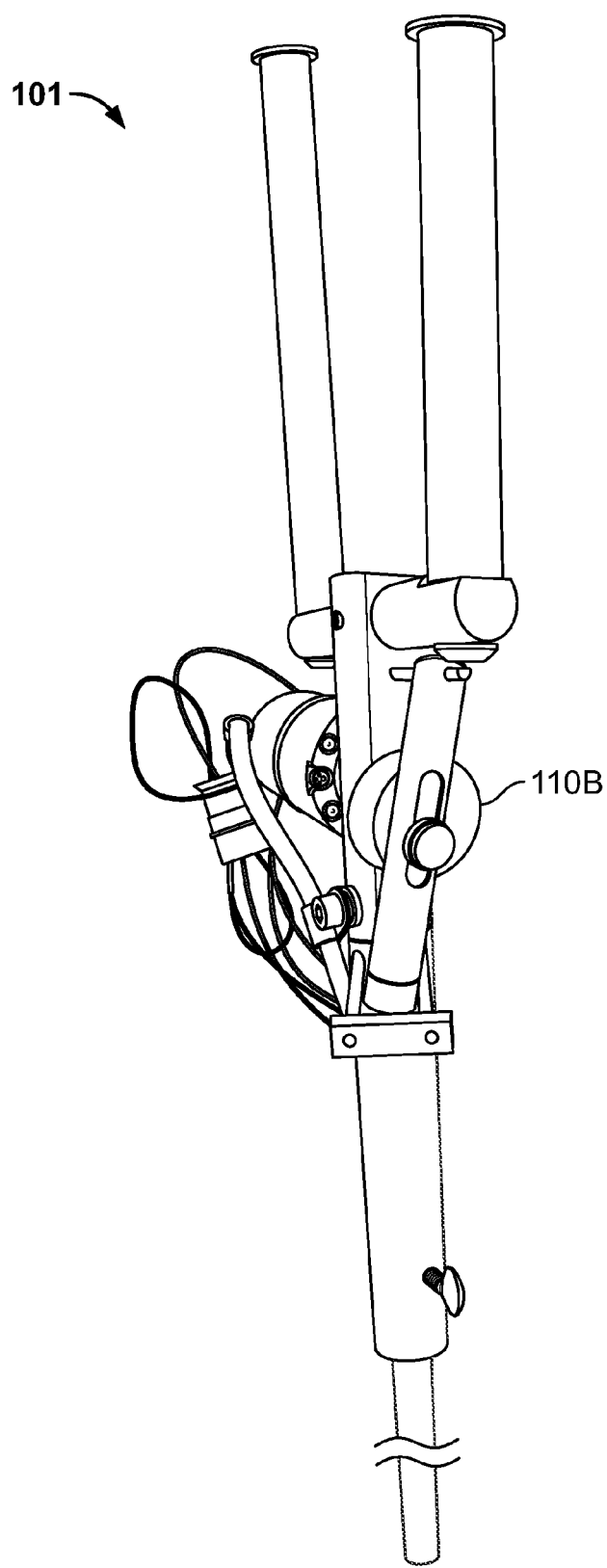
Figure 7:
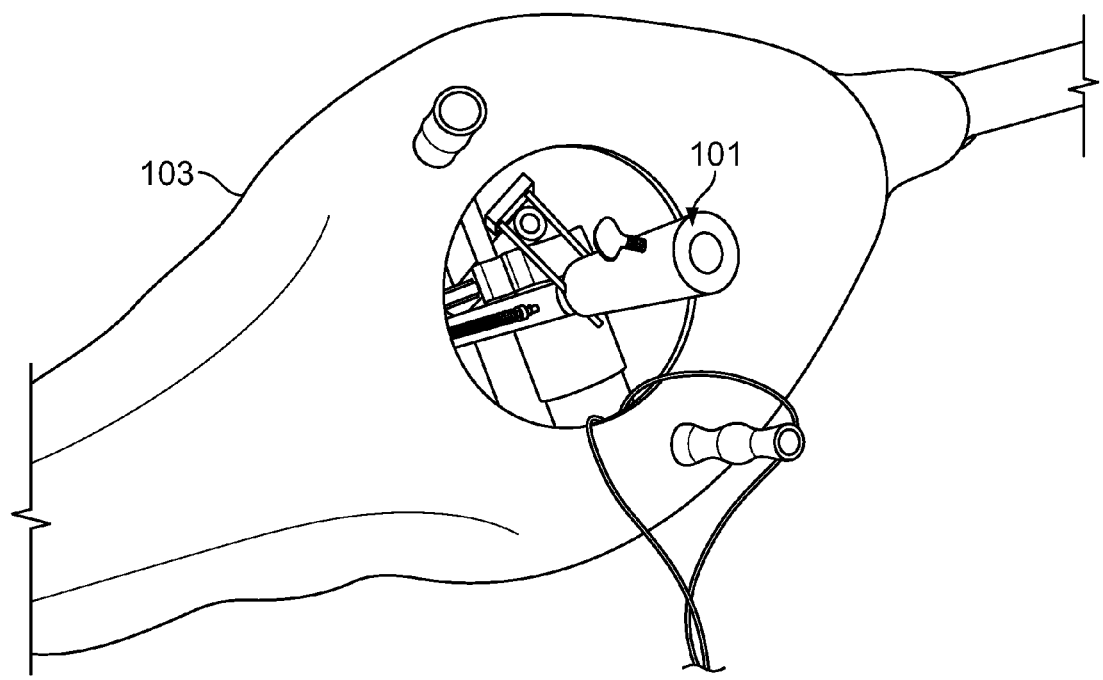
Figure 8:
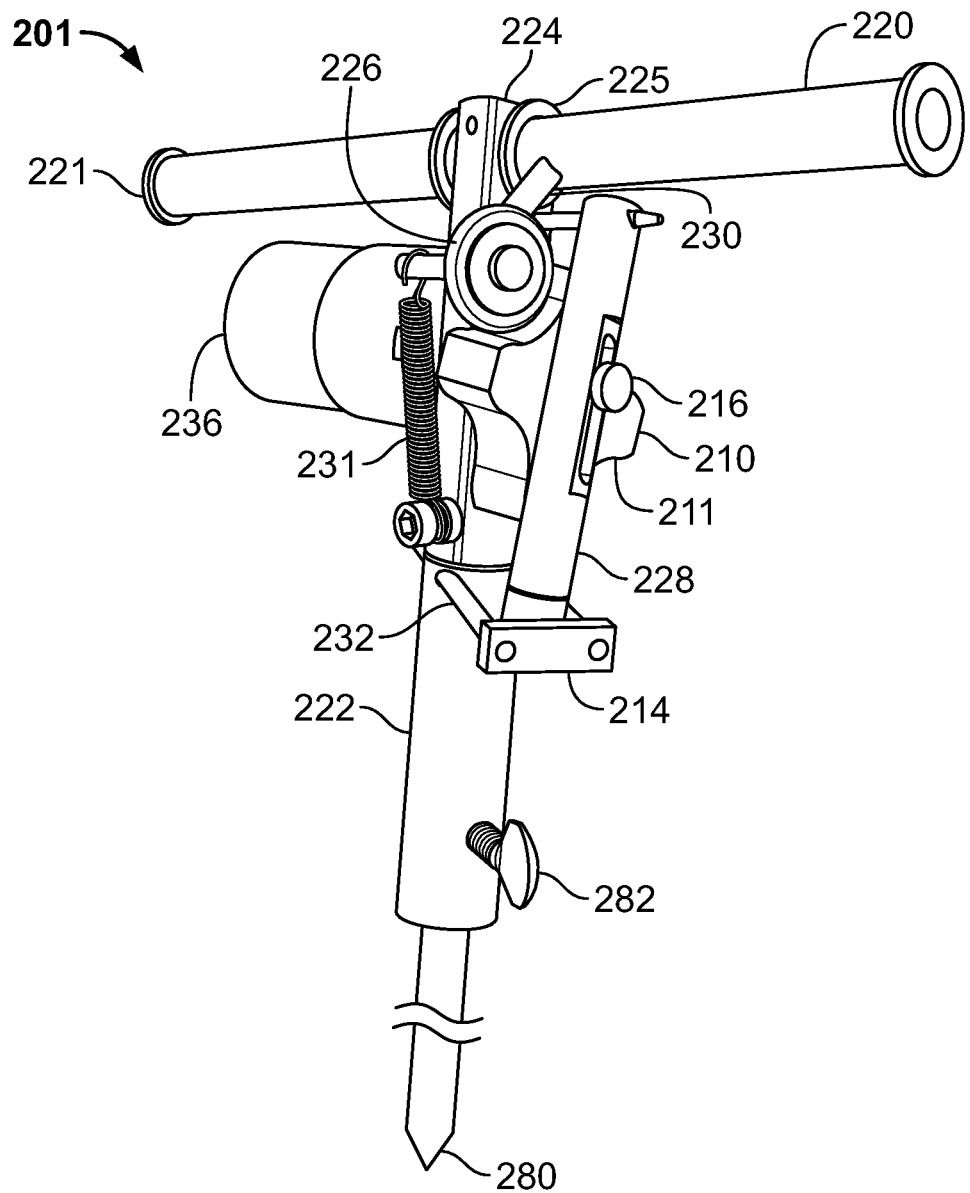
Figure 9:
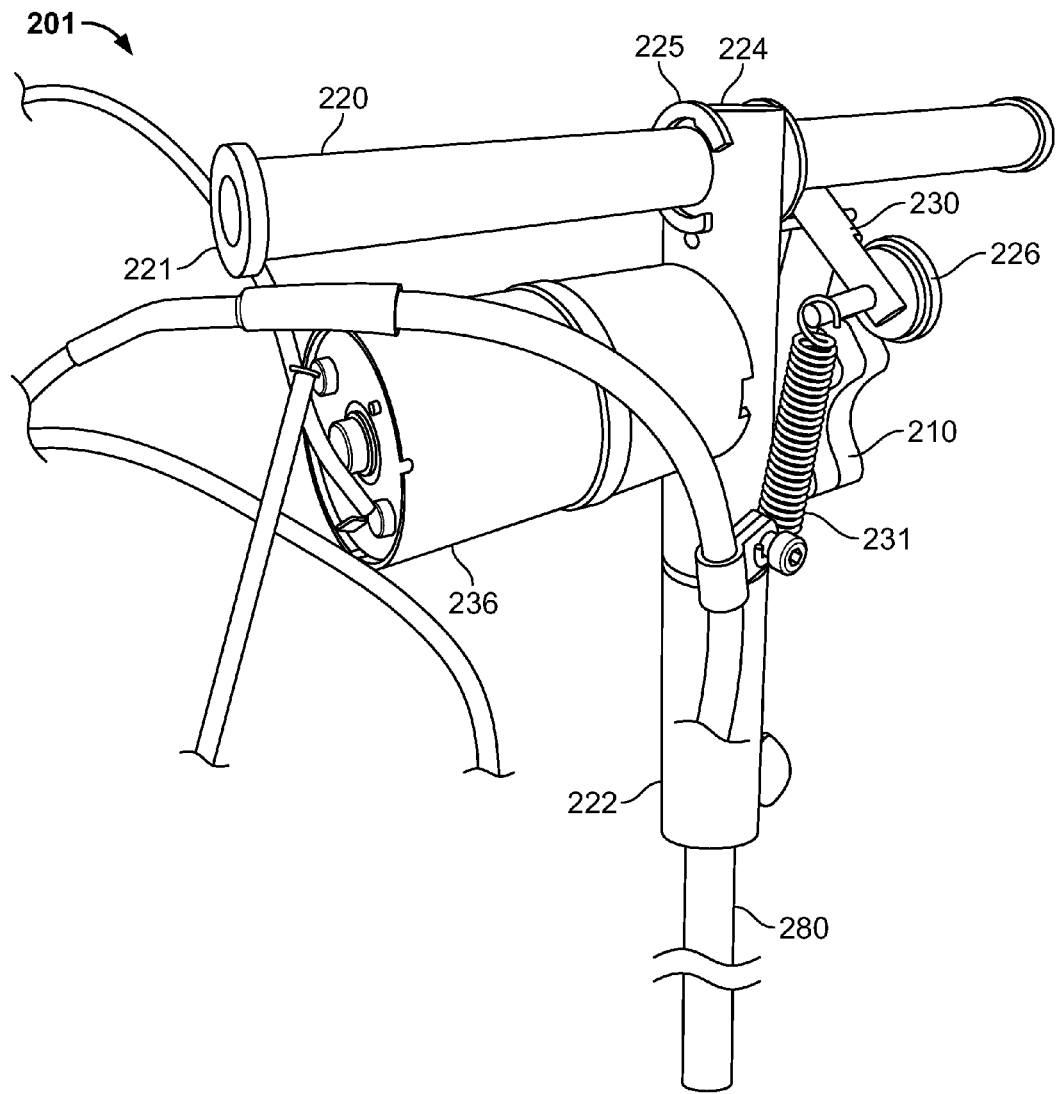
Figure 10:
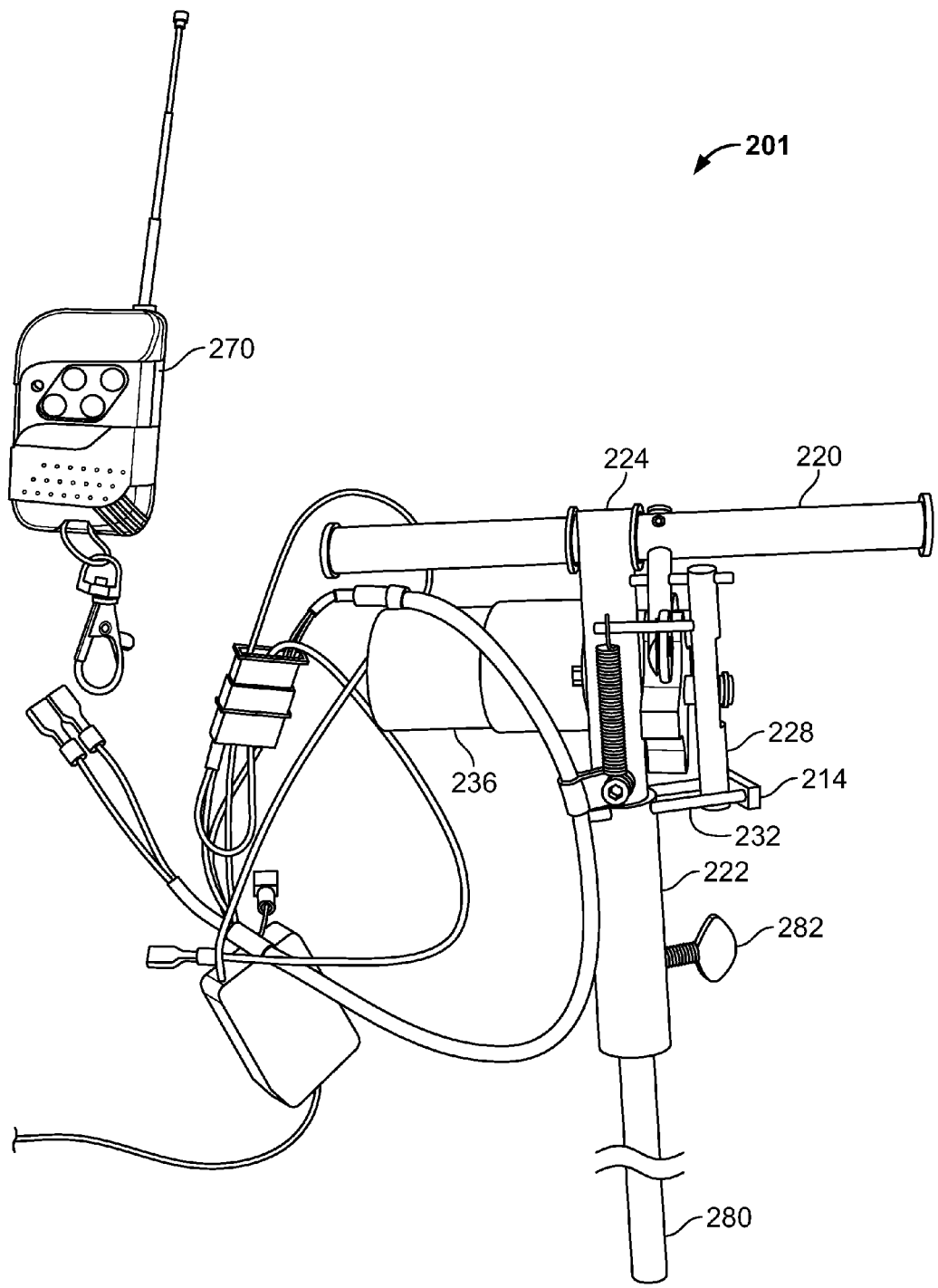
Figure 11:
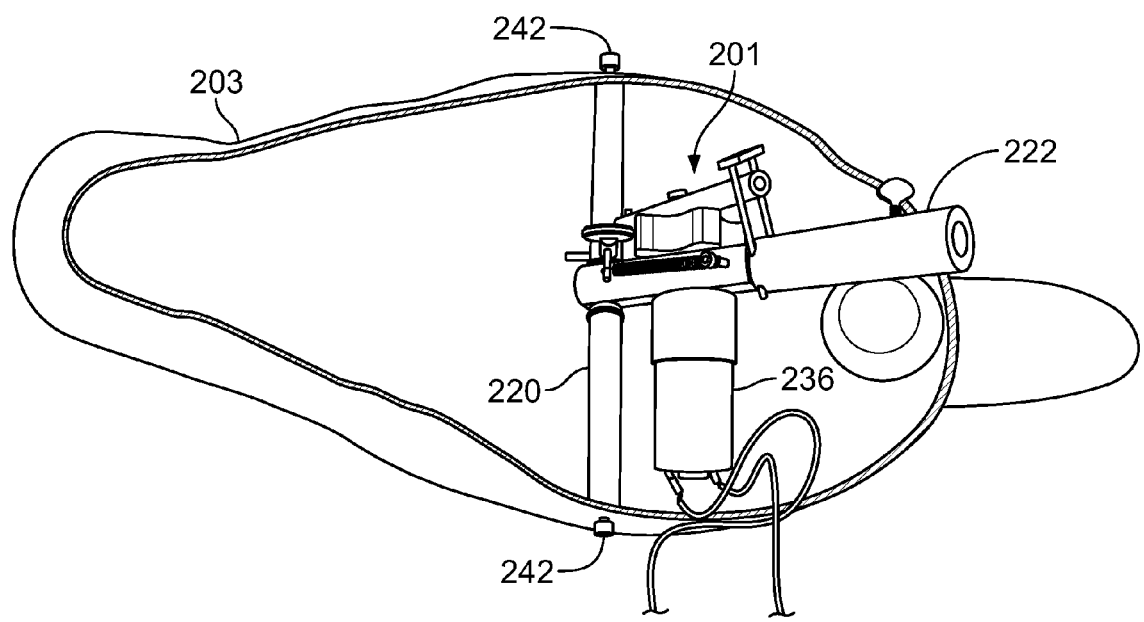
Figure 22:
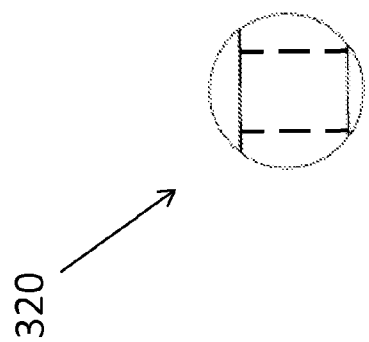
Figure 21:
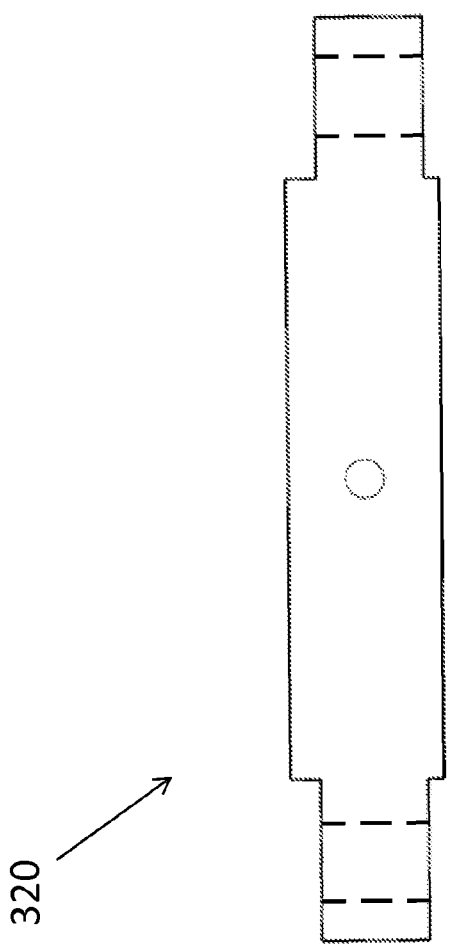
Figure 26:
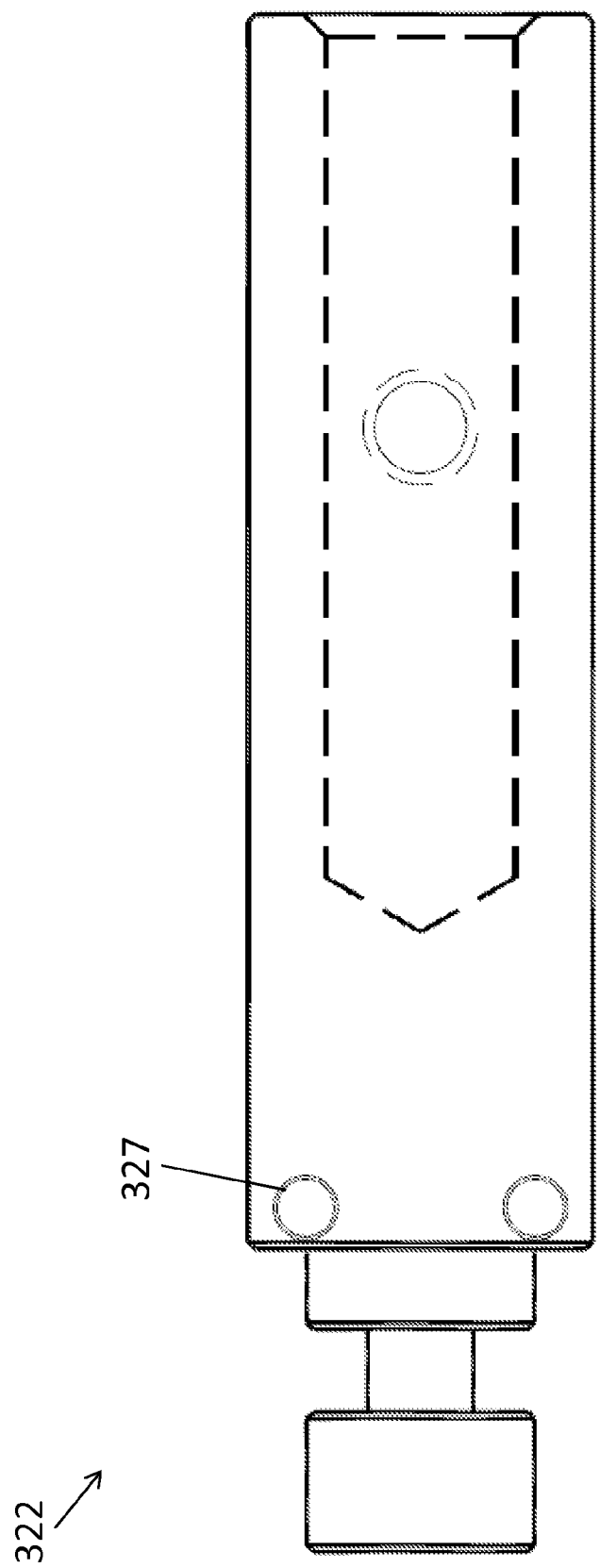
Figure 30:
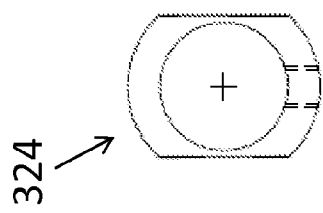
Figure 32:
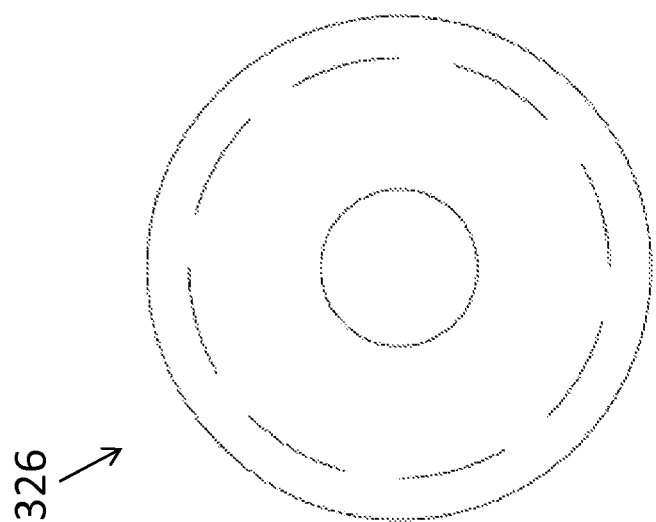
Figure 31:
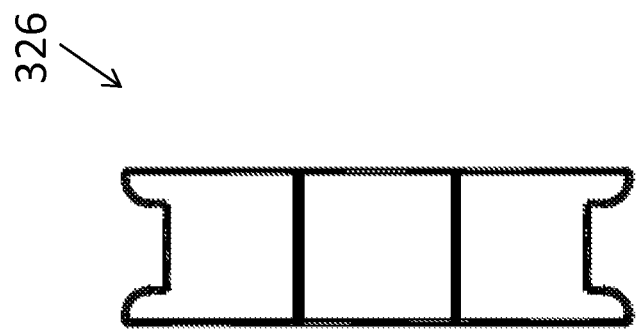
Figure 38:
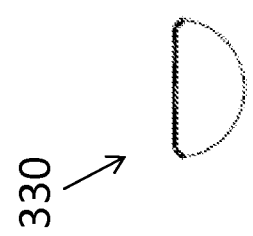
Figure 37:
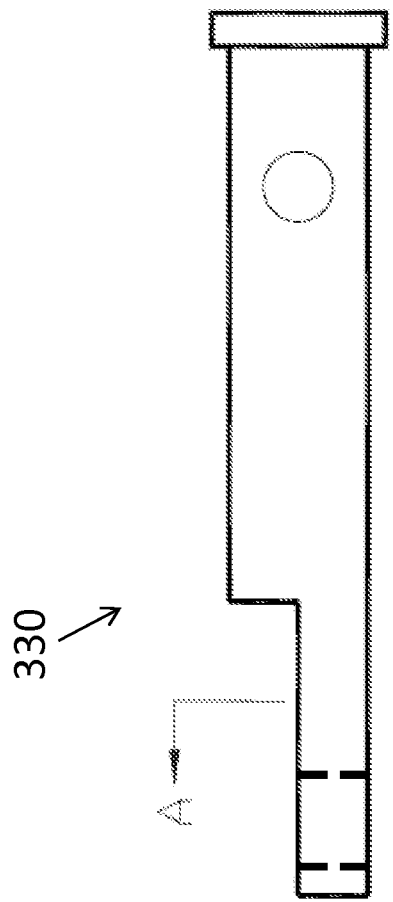
Figure 45:
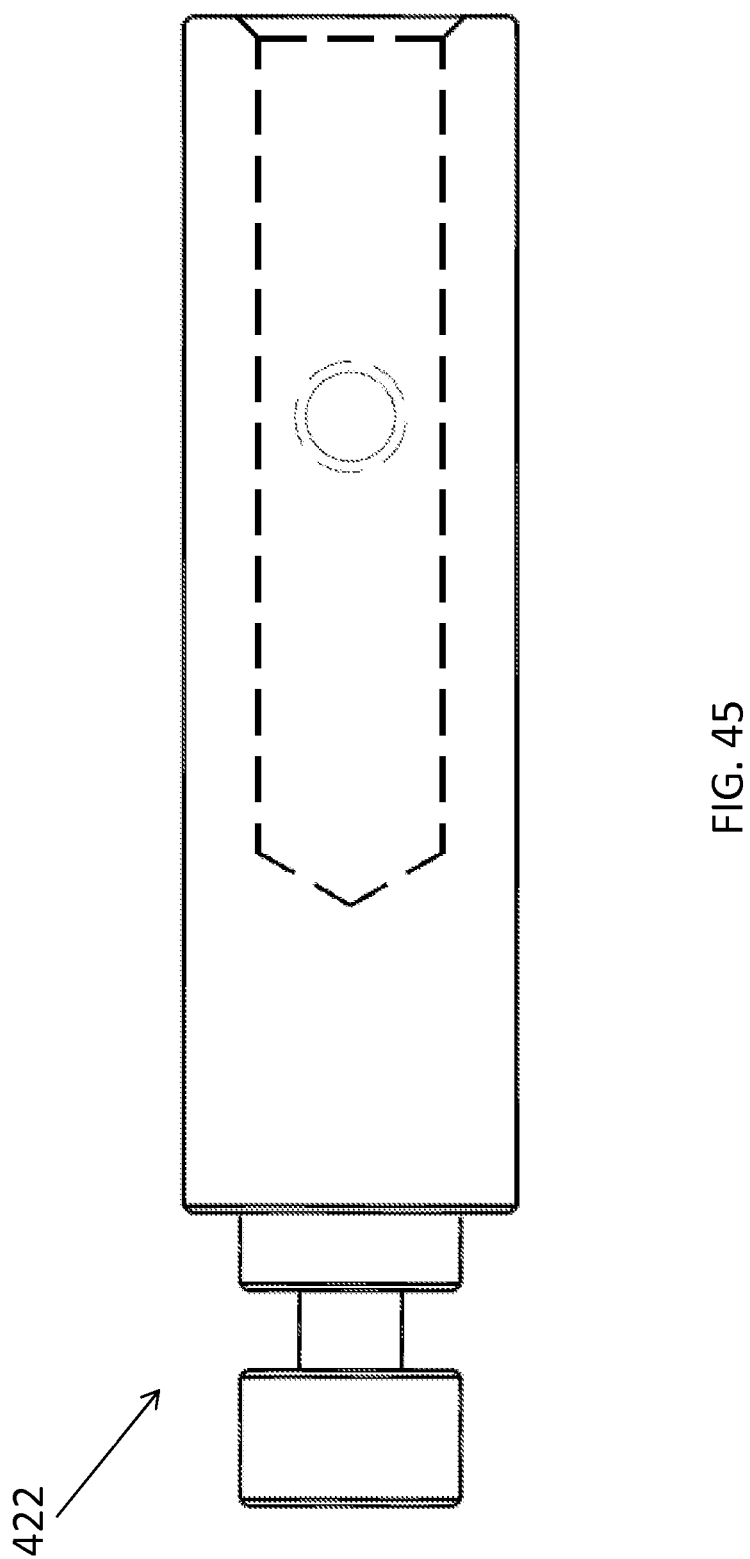

FIG. 4 is a perspective view of the system or mechanical assembly of FIGS. 1 and 2, which is now shown with a cam having three lobes or camming surfaces according to an exemplary embodiment, whereby the system is operable for producing a sweeping motion and a peck feeding motion and the largest lobe is configured such that the decoy's head will also raise as the wheel travels along the largest lobe;

FIG. 5 is another perspective view of the mechanical assembly or system shown in FIG. 4;

FIG. 6 is a perspective view of the system or mechanical assembly of FIGS. 1 and 2, which is now shown with a circular round cam or crank that does not include any lobes according to an exemplary embodiment, whereby the system is operable for producing the sweeping, rotational movement for a decoy without any up-and-down peck feeding motion;

FIG. 7 is a perspective view showing the system of FIGS. 1 and 2 in use with a duck decoy where the vertical arms, horizontal arm or pivot shaft, cam, and motor have been positioned through a hole and within a hollow interior of the duck decoy body;

FIG. 8 is a perspective view of a mechanical assembly or system that may be used for providing motion in an animal decoy according to another exemplary embodiment in which the system includes a horizontal arm or pivot shaft without any upwardly extending vertical arms (as does the system in FIGS. 1 and 2), and the system includes a cam with four spaced-apart lobes or camming surfaces, whereby the system is operable for producing a sweeping motion and a peck feeding motion for a decoy;

FIG. 9 is another perspective view of the mechanical assembly or system shown in FIG. 8;

FIG. 10 is a perspective view of the mechanical assembly or system of FIGS. 8 and 9 now shown with an optional remote control that may be used to turn the system on/off, increase/decrease speed of motion, and/or delay motion/stop and start intervals according to an exemplary embodiment;

FIG. 11 is a perspective view showing the system of FIGS. 8 and 9 in use with a duck decoy where the end portions of the horizontal arm or pivot shaft are coupled (e.g., mechanically fastened, etc.) to the sidewalls of the duck decoy body;

FIG. 12 shows an exemplary cam having four lobes or camming surfaces that may be used with the systems shown in FIGS. 1 and 8 for producing a peck feeding motion and a sweeping motion for a decoy;

FIG. 13 is a sectional view of the cam taken along the plane A-A shown in FIG. 12;

FIG. 14 shows an exemplary cam having three lobes or camming surfaces that may be used with the system shown in FIGS. 4 and 5 for producing a sweeping motion and a peck feeding motion with a head raise for a decoy;

FIG. 15 is a sectional view of the cam taken along the plane A-A shown in FIG. 14;

FIG. 16 shows an exemplary stake that may be coupled to a bottom mount of a system and driven into the ground to support the system and decoy above the ground, where a length of the stake may depend on the type of decoy;

FIGS. 17 and 18 are respective front and side views of an exemplary sweep block that may be used in the systems shown in FIGS. 1 and 8, where the sweep block includes openings for receiving pins;

FIG. 19 shows an exemplary sweep arm pin that may be used in the systems shown in FIGS. 1 and 8;

FIG. 20 shows an exemplary roller/spring pin that may be used in the systems shown in FIGS. 1 and 8;

FIGS. 21 and 22 are respective front and side views of an exemplary pivot shaft or arm that may be used (horizontally) in the system shown in FIG. 6 when the system is configured to produce sweeping side-to-side (looking) motion only;

FIGS. 23 and 24 are respective front and side views of an exemplary pivot shaft or arm that may be used (horizontally) in the system shown in FIG. 1 when the system is configured to produce peck feeding motion and a sweeping motion;

FIG. 25 is a sectional view of the pivot shaft taken along the plane A-A shown in FIG. 23;

FIG. 26 shows an exemplary bottom mount that may be used in the systems shown in FIGS. 1 and 8;

FIGS. 27, 28, 29, and 30 are respective opposite side views and top and bottom views of an exemplary top mount that may be used in the systems shown in FIGS. 1 and 8;

FIGS. 31 and 32 are respective side and front views of an exemplary wheel or roller that may be used in the systems shown in FIGS. 1 and 8;

FIGS. 33, 34, and 35 are respective opposite side views and a top view of an exemplary sweep arm that may be used in the systems shown in FIGS. 1 and 8 to help create rotational sweeping motion;

FIG. 36 is a sectional view of the sweep arm taken along the plane A-A shown in FIG. 34;

FIG. 37 shows an exemplary lift pin that may be used in the systems shown in FIGS. 1 and 8 to help create vertical motion along with the wheel and cam;

FIG. 38 is a sectional view of the lift pin taken along the plane A-A shown in FIG. 37;

FIG. 39 shows an exemplary vertical arm or pivot shaft that may be used (vertically) in the system shown in FIG. 1 for a duck decoy;

FIG. 40 shows an exemplary vertical arm or pivot shaft that may be used (vertically) in the system shown in FIG. 1 for a goose decoy;

FIG. 41 shows an exemplary cam that may be used with the system shown in FIG. 1 for producing a sweeping motion and a peck feeding motion such that a head of decoy will stay down longer (e.g., with a motor speed of 10 RPM, etc.);

FIG. 42 is a sectional view of the cam taken along the plane A-A shown in FIG. 41;

FIG. 43 shows an exemplary circular round cam or crank that may be used with the system shown in FIG. 6 for producing a sweeping, rotational movement for a decoy without any up-and-down peck feeding motion;

FIG. 44 is a sectional view of the cam taken along the plane A-A shown in FIG. 43;

FIG. 45 shows an exemplary bottom mount configured for free spin or rotation without holes for receiving pins connected to the sweep block;

FIG. 46 shows an exemplary pivot shaft that may be used (horizontally) in the system shown in FIG. 8 that includes a horizontal arm or pivot shaft but no upwardly extending vertical arms;

FIG. 47 shows an exemplary pivot shaft that may be used (horizontally) in a system that includes a horizontal arm or pivot shaft but no upwardly extending vertical arms; and FIGS. 48 and 49 show a flexible attachment structure that may be attached on top of the two upwardly extending vertical arms of the system shown in FIG. 1 and then positioned inside a decoy body to help keep the decoy body expanded while in motion according to an exemplary embodiment.

Corresponding reference numerals indicate corresponding parts throughout the several views of the drawings.

DETAILED DESCRIPTION

Example embodiments will now be described more fully with reference to the accompanying drawings.

As noted above in the background, the inventor hereof has recognized that conventional decoys do not have a natural appearance in terms of natural motion and have very little or limited available movements/motions or options. Conventional decoys are also not modifiable and do not have interchangeable components to adapt to the desired motions of a different species or situation in which they are used. The inventor also recognized the need for systems and methods for providing motion in animal decoys that replicates real life motions/movements/situations of the animals being emulated by the decoys and that allows for interchangeable components that allows modification based on the situation and animal being emulated.

After recognizing the above, the inventor hereof has developed and discloses herein, exemplary embodiments of mechanical assemblies or systems that may be used to create or provide various motions in animal decoys, such as in a decoy of a duck, goose, turkey, deer, dove, crow, coyote, among other types of birds, mammals, etc. In exemplary embodiments, a mechanical assembly may have interchangeable components with optional remote control capabilities. For example, different interchangeable cams may be provided for producing different motions for different decoys, such as peck feeding motion only, sweeping motion only (e.g., by using a circular round cam or crank, etc.), peck feeding and sweeping motions (e.g., by using a cam with spaced-apart lobes or contoured surfaces, etc.), greater or less ranges of motions, etc.

Exemplary embodiments of the mechanical assemblies or systems disclosed herein may be used to create or provide sweeping (left to right and back) motions and/or peck (up-and-down) feeding motions for wild bird decoys (e.g., ducks, geese, dove, crow, drake, etc.). For example, a decoy in an upright stretch stance and raised head position may be provided with only a sweeping motion in which the entire decoy body is rotated left to right and back approximated 60 degrees stopping and starting at different intervals with a pre-programmed timer. The timer may be set to run as follows: 4 seconds on/1 second off, 2 seconds on/2 seconds off, 3 seconds on/3 seconds off, then repeat, etc.

Or, for example, a decoy in a feeding position with the head low may be provided with only an up-down peck feeding motion to emulate a bird feeding. As a further example, a bird decoy in a feeding position with the head low may be provided with both the sweeping motion and the peck feeding motion. To emulate a flock of birds, combinations of these different decoys with different motions may be used at the same time.

With exemplary embodiments of the mechanical assemblies or systems disclosed herein, there are multiple possible combinations that can be used to create various natural motions depending on the components used within the assembly, which are interchangeable, and depending on which of the different ways (e.g., two different ways) is used to attach the mechanical assembly to a decoy.

By way of example, an exemplary embodiment of a mechanical assembly or system runs on a 12 volt DC battery and has optional remote capabilities. A relatively small DC motor is used as the drive mechanism. The mechanical assembly may be altered (e.g., using a cam with differently configured cam lobes, etc.) in various ways to create different type motions. The speed can be controlled as well as the starting and stopping of the motion. The mechanical assembly may be used to create various types of motion (e.g., rotational, oscillatory, random, transitional, linear, irregular, pivotal, horizontal, vertical, etc.) with one assembly and one motor in a single cycle.

As disclosed herein, various component pieces in the exemplary embodiments of the systems or mechanical assemblies may have predetermined configurations (e.g., positioning, sizing, profiles, cams with a particular number of lobes, lobe height, lobe shape, and lobe size, etc.) to perform or function in a particular way. For example, two or more cams may be selectively interchangeable where each cam has a different configuration (e.g., a different number of lobes, lobes having different shapes, sizes, etc.) for producing a different motion. See, for example, the different lobe configurations of the cams or cranks shown in FIGS. 12, 14, 41, and 43.

In an exemplary embodiment, a system for motion in an animal decoy may include a top mount having at least one pivot point. A motor is attached to the top mount. A cam is mounted on a shaft of the motor. A roller or wheel follows and rolls along a surface (e.g., perimeter or outer surface, etc.) of the cam. A pivot shaft is inserted into the top mount. A sweep arm is attached to the top mount and the cam. A bottom mount is inserted into the top mount. One or more (e.g., two, etc.) sweep pins are inserted into the bottom mount. In use, the system provides the animal decoy with a more natural motion that better reflects the actual animal the decoy is intended to emulate.

The present disclosure may allow for multiple types of motion and egress of movement in a single assembly. The available motions may be, but not limited to, replicating feeding, standing, walking, looking, stretching, flying, injured, mating and other natural behaviors.

With reference now to the figures, FIGS. 1 and 2 illustrate an exemplary embodiment of a mechanical assembly or system 101 embodying one or more aspects of the present disclosure. The system 101 may be used for providing a sweeping and/or peck feeding motion in an animal decoy, such as a duck decoy 103 as shown in FIG. 7. For example, the system 101 may be operable for providing the duck decoy 103 with a sweeping motion by rotating the duck decoy 103 a predetermined amount (e.g., about 15, 30, 45, or 60 degrees, etc.) in a first direction (e.g., a right-to-left direction, etc.) and then rotating the duck decoy 103 the predetermined amount in an opposite second direction (e.g., a left-to-right direction, etc.). Additionally, or alternatively, the system 101 may be operable for providing the duck decoy 103 with a peck feeding motion by pivoting the duck decoy 103 a predetermined amount (e.g., about 10, 20, or 30 degrees, etc.) in a third direction (e.g., downwardly from an upright position, etc.) and then pivoting the duck decoy 103 the predetermined amount in an opposite fourth direction (e.g., upwardly to the upright position, etc.).

The system 101 may include selectively interchangeable cams having different shapes to create lifelike, natural desired motions relative to the type of decoy and end use. FIG. 2 shows a cam 110 having a configuration for producing a sweeping motion and peck feeding motion. As shown, the cam 110 has four equally spaced apart lobes 111 that have about the same shape and size. The system 101 may also have one or more other cams that have a different shape and size. For example, FIG. 14 shows a cam 410 having a configuration for producing a peck feeding motion for a decoy in an upright stretch stance and raised head position. The configuration of the largest of the three cam lobes 411 (the lobe shown at the top in FIG. 14) produces a much larger range of up-and-down motion. As another example, FIG. 12 shows a cam 310 having four equally spaced apart lobes 311 that have the same shape and size for producing a sweeping motion and peck feeding motion. As a further example, FIG. 41 shows a cam 510 having four equally spaced apart lobes 511 for producing a sweeping motion and a peck feeding motion. But one of the lobes 511 is much shorter (the lobe shown on the left) such that a head of the decoy will stay down longer as the roller or wheel travels along this shorter lobe 511. As yet another example, FIG. 43 shows a cam or crank 610 that doesn't have any lobes. Instead, the cam or crank 610 is circular such that the system will only produce a sweeping motion without any up-and-down peck feeding motion. Accordingly, the size and shape differ for the cams or cranks (e.g., cam 110 (FIG. 2), cam 110A (FIG. 4), cam 110B (FIG. 5), cam 210 (FIG. 8), cam 310 (FIG. 12), cam 410 (FIG. 14), cam 510 (FIG. 41), cam 610 (FIG. 43), etc.) to produce different motions. The size, shape, relative positions/locations, etc. may also differ for the pivot arms, wheel, pivot shaft, sweep arm, top mount, bottom mount, sweep pins, and arm pins to each other to produce different motions.

A stake 180 may be used to support the mechanical assembly 101 and the decoy 103. The stake 180 may be coupled to the bottom mount 122 (FIG. 1). For example, the stake 180 may be coupled to the bottom mount 122 by a thumb screw 182 as shown in FIG. 2. The stake 180 may be driven into the ground or other support foundation to support the assembly 101 and decoy 103.

With continued reference to FIG. 1, the mechanical assembly 101 also includes sweep block 114 to help create the rotational motion. The sweep block 114 is connected to a pair of sweep pins 132. The sweep pins 132 are coupled (e.g., mechanically fastened, attached, etc.) to a bottom mount 122. An end portion of sweep arm 128 is between the sweep pins 132 such that the sweep pins 132 contact or abut against the sweep arm 128 during operation.

A sweep arm pin 116 may be used as a pivot point for the sweep arm 128 and to maintain location and distance as well as degree of motion. The sweep arm 128 may be altered, e.g., may be attached to a pivot or sweep block, pivot arm, sweep pins, pivot pins, etc.

A spring pin 118 may be used with a wheel or roller 126 as a rotational axle and to allow the roller 126 to freely spin. A lift pin or arm 130 helps to create vertical motion within the system 101 along with the wheel 126. A spring 131 may be attached to or between points 118 (e.g., roller pin, etc.) and 135 (e.g., mount pin, mechanical fastener, etc.). The spring 131 operates to help keep the wheel roller 126 in contact with the cam 110. The wheel or roller 126 may be altered to create various degrees of angular movement.

A pivot shaft or horizontal arm 120 may allow the decoy to rotate in a vertical/pivotal motion and return. The pivot shaft 120 may be the mounting point for the decoy body and the location point for a top mount 124. In this example, the system 101 includes two upwardly extending vertical arms 123 coupled to the horizontal pivot shaft 120. Alternatively, other exemplary embodiments may include a horizontal arm or pivot shaft without any vertical arms. See, for example, FIG. 8 illustrating a system 201 having a horizontal arm or pivot shaft 220 without any upwardly extending vertical arms.

The top mount 124 (FIG. 1) helps create rotational, pivotal, oscillatory, rectilinear, curvilinear, random, and translational motions and may attach to the bottom mount 122 to allow motion about its axis. The top mount 124 may serve as a mount for the motor 136. The cam 110 may be mounted on the shaft of the motor 136, such that the cam 110 is rotated by the motor 136. The motor 136 may be adjusted (e.g., increase or decrease speed, etc.) based on the application. The pivot shaft 120 may help support the decoy body and may help with the rotational movement about the axis of the top mount 124 and the bottom mount 122.

By way of example only, an exemplary process for assembling the components of the mechanical assembly or system 101 will now be provided. The pivot shaft 120 may be inserted into a top or upper opening of the top mount 124 and secured in place by two snap rings 125. The snap rings 125 may be located within two grooves in the pivot shaft 120.

The motor 136 may be coupled or attached to the top mount 124 and secured with cap screws in predetermined locations. The cam 110 may be coupled to or mounted on the shaft of the motor 136 and secured with set screws.

The arm pin 116 may be inserted or put thru a slot 137 in the sweep arm 128. The arm pin 116 may also be pressed into a predrilled hole in the cam 110 to maintain location. A pin 117 may also be inserted or put thru a hole in the top of the sweep arm 128 and then be pressed into a predrilled hole in the top mount 124. The pin 117 may create a pivot point and secure the sweep arm 128 to the top mount 124.

The lift pin or arm 130 may be coupled to (e.g., inserted into an opening of, etc.) the pivot shaft or arm 120. The lift pin or arm 130 may be set to a desired location thru a predrilled hole, which may be adjustable to achieve various degrees of motion depending on the end use. The end portion of the lift pin or arm 130 may be coupled (e.g., secured with a pin, etc.) to the pivot shaft or arm 120.

The wheel or roller 126 may be coupled or attached to the lift pin or arm 130. The spring pin 118 may be coupled or attached to the lift pin or arm 130, e.g., by pressing the end portion of the spring pin 118 into a predrilled hole in the lift pin or arm 130, etc.

The bottom mount 122 may be coupled to the top mount 124 in a way that allows rotation freely without coming apart from each other. For example, the upper portion of the bottom mount 122 may be inserted into an open end portion of the top mount 124 and secured with a pin in a predrilled hole such that top and bottom mounts 124, 122 may rotate freely with respect to each other without coming apart.

The sweep pins 132 may be pressed into the sweep block 114, which may be pressed into the bottom mount 122 such that the sweep arm 128 is between the two sweep pins 132. The spring 131 may be attached to the pin 118 and the fastener 135.

A wiring harness may be attached to the motor 136. The vertical arms 123 may be coupled to the pivot shaft 120, e.g., by using mechanical fasteners 139 (e.g., screws, etc.), etc. The vertical arms 123 may be coupled to the pivot shaft 120 at certain locations depending on the decoy's size, shape, animal species, etc. Alternatively, other assembly processes, fasteners besides pins (e.g., rivets, screws, other mechanical fasteners, adhesives, etc.) etc. may also be used in other exemplary embodiments.

As shown in FIG. 7, the mechanical assembly or system 101 may be used with a duck decoy 103. The system 101 (FIG. 1) may be mounted or connected to the body of the duck decoy 103 by positioning the vertical arms 123 of the system 101 through an opening at the bottom of the decoy body and into the hollow interior cavity of the decoy body. The free ends of the vertical arms 123 and/or opposite ends of the horizontal pivot shaft 120 to which the vertical arms 123 are coupled may be attached or fastened to the decoy body using mechanical fasteners (e.g., screws, etc.). The mechanical fasteners may be inserted or driven through the decoy body and into threaded fastener openings at the free ends of the vertical arms 123 and/or the opposite ends of the horizontal pivot shaft 120.

The system 101 may be coupled (e.g., frictionally engaged, etc.) to a decoy body using the flexible attachment structure 160 shown in FIGS. 48 and 49. The flexible attachment structure 160 (e.g., a resiliently flexible steel ribcage, etc.) may be attached (e.g., via fasteners, etc.) on top of the two vertical arms 123 and positioned inside the body of the decoy 103 (FIG. 7). To position the flexible attachment structure 160 inside the decoy body, the cross members or arms 162 may be folded or bent in order to fit through the relatively small opening at the bottom of the decoy body and into the hollow interior cavity of the decoy body. After the flexible attachment structure 160 is inside the decoy body's hollow interior cavity, the arms or cross members 162 may flex or spring outwardly towards their original shape into contact with the interior surface inside the decoy body, to thereby form a "rib cage" against the interior surface inside the decoy body. The outward biasing force of the flexible attachment structure 160 may help keep the decoy body expanded while in motion.

Figure 3:
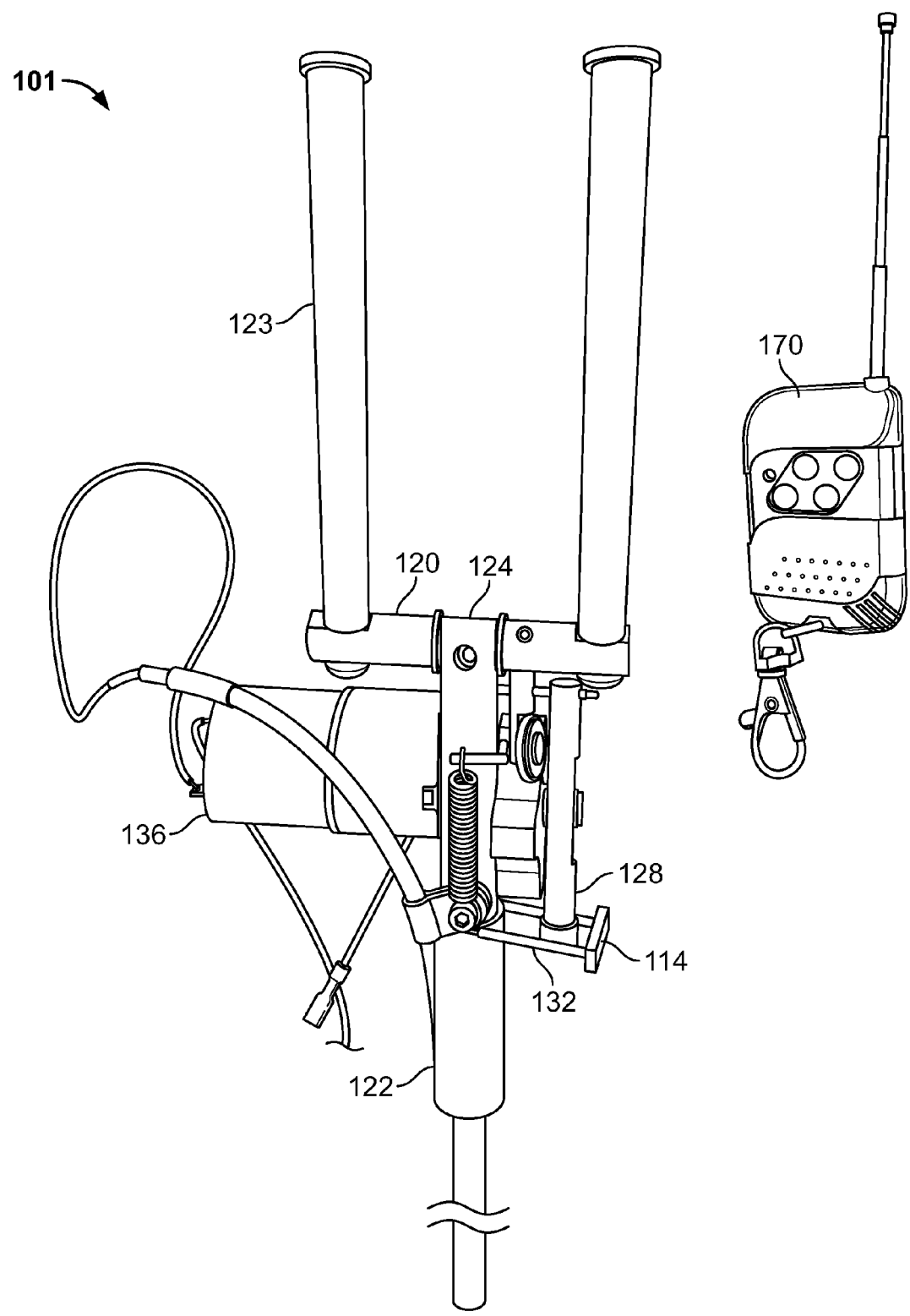
FIG. 3 is a perspective view of the mechanical assembly or system of FIGS. 1 and 2 now shown with an optional remote control that may be used to turn the system on/off, increase/decrease speed of motion, and/or delay motion/stop and start intervals according to an exemplary embodiment.

The system 101 may be used for providing a sweeping and/or peck feeding motion in an animal decoy, such as a duck, goose, turkey, deer, dove, crow, etc. FIG. 3 shows the system 101 with an optional remote control 170 that may be used to turn the system on/off, increase/decrease speed of motion, and/or delay motion/stop and start intervals according to an exemplary embodiment.

The system 101 may include configurable or interchangeable components (e.g., include differently configured cams within a kit, different mounting arrangements, etc.) to create lifelike, natural desired motions relative to the type of decoy and end use. For example, an end user may want to interchange, substitute, or swap out the cam 110 (FIG. 2) for a different cam such that the system 101 provides or creates a different motion for a decoy. In FIGS. 1 and 2, the system 101 includes the cam 110 with four spaced-apart lobes or camming surfaces 111. Each cam lobe 111 includes a top flat surface between two contoured or curved surfaces. When the system 101 includes the cam 110, the system 101 is operable for producing a sweeping motion and a peck feeding motion for the decoy. When the wheel roller 126 travels along the flat surfaces, the motion pauses or stops before restarting when the wheel roller 126 travels along the curved or contoured surfaces. See also, for example, the cam 310 and cam lobes 311 shown in FIG. 12. Alternatively, the system 101 may be provided with any one of a plurality of different interchangeable cams to produce different motions, such as cam 410 (FIG. 14), cam 510 (FIG. 41), cam or crank 610 (FIG. 43), etc.

FIG. 4 shows the system or mechanical assembly 101 after it has been equipped or provided with a different cam 110A. The cam 110A has three lobes or camming surfaces 111A. The cam 110A is configured such that the system 101 is operable for producing a sweeping motion and a peck feeding motion. The largest lobe 111A is configured such that the decoy's head will raise as the wheel roller 126 travels along the largest lobe, whereby the cam 110A produces a greater range of up-and-down motion than the cam 110 having the four equally spaced-apart identical lobes 111 shown in FIG. 2. See also, for example, the cam 410 and cam lobes 411 shown in FIG. 14.

FIG. 6 shows the system or mechanical assembly 101 after it has been equipped or provided with different cam or crank 110B. The cam 110B is circular or round. The cam 110B does not include any outwardly extending lobes. In this example, the system 101 is operable for producing a sweeping, rotational movement for a decoy (e.g., an upright duck or goose decoy, etc.) without any up-and-down peck feeding motion. Because the system 101 shown in FIG. 6 does not produce any up-and-down peck feeding motion, the system 101 does not include or require all of the same components as did the system 101 shown in FIG. 1, such as the spring 131, lift pin or arm 130, and wheel roller 126. Accordingly, a comparison of FIGS. 1, 4, and 6 demonstrates how a common or single system may be modified and tailored for a particular end use, e.g., decoy, motion, etc.

FIGS. 8 and 9 illustrate another exemplary embodiment of a mechanical assembly or system 201 embodying one or more aspects of the present disclosure. The system 201 may include similar features, components, and be operated similar to the system 101 (FIGS. 1 and 2) for providing a sweeping and/or peck feeding motion in an animal decoy, such as a duck, goose, turkey, deer, dove, crow, etc.

As shown in FIG. 8, the system 201 includes a cam 210, sweep block 214, sweep arm pin 216, bottom mount 222, top mount 224, roller or wheel 226, sweep arm 228, lift pin or arm 230, coil spring 231, sweep pins 232, motor 236, and stake 280. These various components of system 201 may be identical or similar to the components of the system 101 (FIG. 1) having corresponding reference numerals.

But the system 201 includes a horizontal arm or pivot shaft 220 (FIGS. 8 and 9) without any upwardly extending vertical arms coupled to the pivot shaft 220. By comparison, the system 101 (FIGS. 1 and 2) includes two upwardly extending vertical arms 123 coupled to the horizontal pivot shaft 120.

With continued reference to FIGS. 8 and 9, the cam 210 includes four spaced-apart lobes or camming surfaces 211. Each cam lobe 211 includes a top flat surface between two contoured or curved surfaces. When the system 201 includes the cam 210, the system 201 is operable for producing a sweeping motion and a peck feeding motion for the decoy. When the wheel roller 226 travels along the flat surfaces, the motion pauses or stops before restarting when the wheel roller 226 travels along the curved or contoured surfaces. See also, for example, the cam 310 and cam lobes 311 shown in FIG. 12.

The system 201 may be provided with any one of a plurality of different interchangeable cams to produce different motions, such as cam 410 (FIG. 14), cam 510 (FIG. 41), cam 610 (FIG. 43), etc. For example, the system 201 may include configurable or interchangeable components (e.g., include differently configured cams within a kit, different mounting arrangements, etc.) to create lifelike, natural desired motions relative to the type of decoy and end use. An end user may thus interchange, substitute, or swap out the cam 210 (FIG. 8) for a different cam in order to have the system 201 provide or create a different motion for a decoy.

As shown in FIG. 11, the mechanical assembly or system 201 may be used with a duck decoy 203. The system 201 may be mounted or connected to the body of the duck decoy 203 by positioning the horizontal arm or pivot shaft 220 through an opening at the bottom of the decoy body and into the hollow interior cavity of the decoy body. The opposite ends of the horizontal arm 220 may then be coupled to the sidewall of the decoy body using mechanical fasteners 242 (e.g., screws, etc.). The mechanical fasteners 242 may be inserted or driven through the decoy body and into threaded fastener openings at the ends of the horizontal arm 220. See, for example, the fastener openings at the ends of the horizontal arms or pivot shaft 520 (FIG. 46) and 620 (FIG. 47).

The system 201 may be used for providing a sweeping and/or peck feeding motion in an animal decoy, such as a duck, goose, turkey, deer, dove, crow, etc. FIG. 10 shows the system 201 with an optional remote control 270 that may be used to turn the system on/off, increase/decrease speed of motion, and/or delay motion/stop and start intervals according to an exemplary embodiment.

FIGS. 12 through 64 show various components that may be used in systems for providing motion in animal decoys, such as system 101 (FIG. 1) and/or system 201 (FIG. 8), etc. More specifically, FIGS. 12 and 13 show an exemplary cam 310 that may be made out of 6061-T6511 aluminum with a black hard coat anodization or other suitable materials. The cam 310 may be used in a system (e.g., 101 (FIG. 1), 201 (FIG. 8), etc.) for producing a peck feeding motion and a sweeping motion for a decoy.

FIGS. 14 and 15 show an exemplary cam 410 that may be made out of 6061-T6511 aluminum with a black hard coat anodization or other suitable materials. The cam 410 may be used with a system (e.g., 101 (FIG. 4), etc.) for producing a sweeping motion and a peck feeding motion with a head raise for a decoy.

FIG. 16 shows an exemplary stake 380 that may be made out of 1018 cold rolled steel with a black oxide finish or other suitable materials. The stake 380 may be coupled (e.g., mechanically fastened, etc.) to a bottom mount (e.g., bottom mount 122 (FIG. 1), 222 (FIG. 8), etc.). The stake 380 may be driven into the ground to support the system and decoy above the ground. The length of the stake 380 may depend on the type of decoy. For example, a longer stake may be used for a goose decoy than for a smaller duck decoy. Also by way of example, FIG. 8 shows the stake 280 coupled to the bottom mount 222 of the system 201 by a thumb screw 282.

FIGS. 17 and 18 show an exemplary sweep block 314 that may be made out of 1018 cold rolled steel with a black oxide finish or other suitable materials. The sweep block 314 includes openings 315 for receiving pins (e.g., sweep pins 332 (FIG. 19), etc.). FIG. 19 shows an exemplary sweep arm pin 332 that may be made out of 1018 cold rolled steel with a black oxide finish or other suitable materials. As disclosed above for system 101, the sweep block 114 helps create the rotational motion of the system 101. The sweep block 114 is connected to sweep pins 132.

FIG. 20 shows an exemplary roller/spring pin 318 that may be made out of 1018 cold rolled steel with a black oxide finish or other suitable materials. The pin 318 may be used with a wheel or roller (e.g., 126 (FIG. 1), 226 (FIG. 8), etc.) as a rotational axle and to allow the wheel or roller to freely spin.

FIGS. 21 and 22 show an exemplary pivot shaft or arm 320 that may be made out of 6061-T6 aluminum with a black hard coat anodization or other suitable materials. By way of example, the pivot shaft or arm 320 may be used (horizontally) in a system configured to produce sweeping side-to-side (looking) motion only.

FIGS. 23, 24, and 25 show an exemplary pivot shaft or arm 420 that may be made out of 6061-T6 aluminum with a black hard coat anodization or other suitable materials. By way of example, the pivot shaft or arm 420 may be used (horizontally) in a system (e.g., system 101 (FIG. 1), etc.) configured to produce peck feeding motion and a sweeping motion.

FIG. 26 shows an exemplary bottom mount 322 that may be made out of 6061-T6511 aluminum with a black hard coat anodization or other suitable materials. By way of example, the bottom mount 322 may be used in the system 101 (FIG. 1) and/or system 201 (FIG. 8). The bottom mount 322 includes openings 327 for receiving pins (e.g., 132 in FIG. 1, etc.) that are connected to the sweep block (e.g., 114 in FIG. 1, etc.).

FIGS. 27, 28, 29, and 30 show an exemplary top mount 324 that may be made out of 6061-T6511 aluminum with a black hard coat anodization or other suitable materials. The top mount 324 may be used in the system 101 (FIG. 1) and/or system 201 (FIG. 8). The top mount 324 includes openings for receiving a pivot shaft, motor shaft, and pin.

FIGS. 31 and 32 show an exemplary cam wheel or roller 326 that may be made out of 1018 cold rolled steel with a black oxide finish or other suitable materials. The wheel or roller 326 may be used in the system 101 (FIG. 1) and/or the system 201 (FIG. 8).

Figure 27:
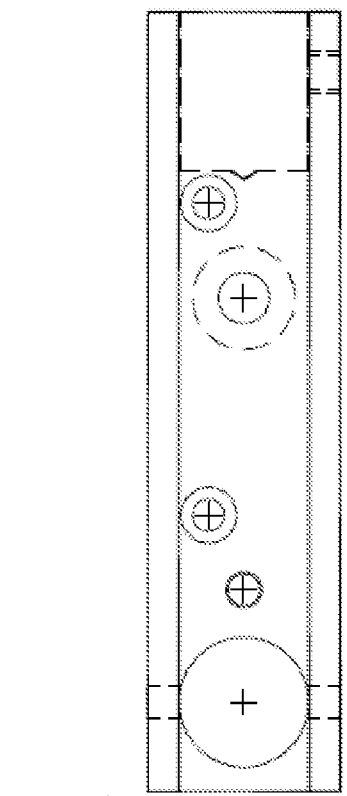
Figure 28:
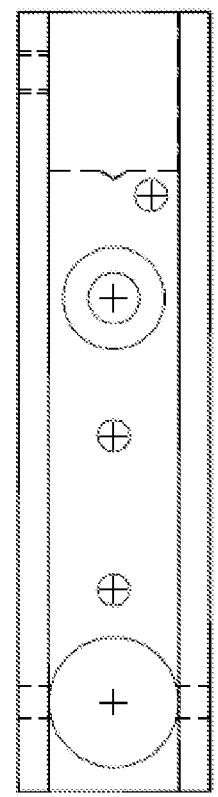
Figure 29:
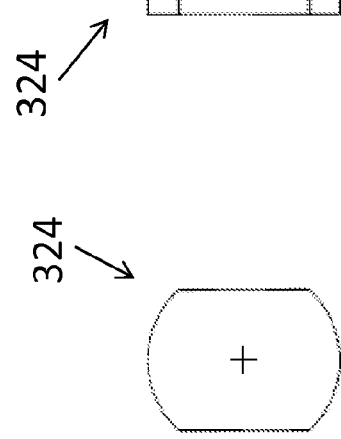

FIGS. 33, 34, and 35 show an exemplary sweep arm 328 that may be made out of 6061-T6511 aluminum with a black hard coat anodization, etc. or other suitable materials. The sweep arm 328 may be used in the system 101 (FIG. 1) and/or 201 (FIG. 8) to help create rotational sweeping motion. The top of the sweep arm 328 includes an opening for receiving a pin to couple to the top mount 324 (FIG. 27). The bottom of the sweep arm 328 includes an opening for receiving an end piece 329 (also shown in FIG. 33 aligned with the opening). The sweep arm 328 also includes a slot 357 for receiving an arm pin.

FIGS. 37 and 38 shows an exemplary lift pin or arm 330 that may be made out of 1018 cold rolled steel with a black oxide finish or other suitable materials. The lift pin 330 may be used in the system 101 (FIG. 1) and/or system 201 (FIG. 8) to help create vertical motion along with the wheel and cam.

FIGS. 39 and 40 respectively show exemplary vertical arms or pivot shafts 323, 423 that may be made out of 6061-T6 aluminum with a black hard coat anodization or other suitable materials. The vertical arm 323 may be used in the system 101 shown in FIG. 1 for a duck decoy. The vertical arm 423 may be used in the system 101 shown in FIG. 1 for a goose decoy. The vertical arm 423 shown in FIG. 40 may have a length more than twice (e.g., almost 2.5 times, etc.) as long as the vertical arm 323 shown in FIG. 39 to accommodate for the larger size of the goose decoy's hollow interior cavity as compared to the duck decoy.

FIGS. 41 and 42 show an exemplary cam 510 that may be made out of 6061-T6511 aluminum with a black hard coat anodization or other suitable materials. The cam 510 may be used with a system for producing a sweeping motion and a peck feeding motion (e.g., with a motor speed of 10 RPM, etc.). But one of the camming surfaces or lobes 511 is much shorter (the lobe shown on the left) such that a head of the decoy will stay down longer as the wheel or roller travels along this shorter lobe 511.

FIGS. 43 and 44 show an exemplary circular round cam or crank 610 that may be made out of 6061-T6511 aluminum with a black hard coat anodization or other suitable materials. The cam 610 may be used as the cam 110B of the system 101 shown in FIG. 6 for producing a sweeping, rotational movement for a decoy (e.g., an upright duck or goose decoy, etc.) without any up-and-down peck feeding motion.

FIG. 45 shows an exemplary bottom mount 422 that may be made out of 6061-T6511 aluminum with a black hard coat anodization or other suitable materials. The bottom mount 422 may be configured for free spin or rotation without holes for receiving pins connected to the sweep block.

FIG. 46 shows an exemplary pivot shaft 520 that may be made out of 6061-T6 aluminum with a black hard coat anodization or other suitable materials. The pivot shaft 520 may be used (horizontally) in the system 201 shown in FIG. 8 that includes horizontal arms (but not vertical arms). The pivot shaft 520 includes two grooves 571 for receiving snap rings to secure and hold the pivot shaft 520 in place relative to a top mount (e.g., 324 (FIG. 27), etc.). The length of the pivot shaft 520 may depend on the type of decoy in which it will be used. For example, a longer pivot shaft may be used for a goose decoy than for a duck decoy to accommodate the greater width of the goose decoy's hollow interior cavity.

FIG. 47 shows an exemplary pivot shaft 620 that may be made out of 6061-T6 aluminum with a black hard coat anodization or other suitable materials. The pivot shaft 620 may be used (horizontally) in a system that includes horizontal arms (but not vertical arms). By way of example, the pivot shaft 620 may be used in a system operable for producing sweeping, side-to-side rotation motion only. The pivot shaft 620 includes an opening 673 at the center for receiving a fastener (e.g., pin, etc.) to secure the pivot shaft 620 to a top mount. In this example, the pivot shaft 620 does not include grooves (e.g., 571 (FIG. 46), etc.) for receiving snap rings. The length of the pivot shaft 620 may depend on the type of decoy in which it will be used. For example, a longer pivot shaft may be used for a goose decoy than for a duck decoy to accommodate the greater width of the goose decoy's hollow interior cavity.

In some exemplary embodiments, the systems for motion in animal decoys may have DC power supplied to a DC motor, a remote control, a speed control, and a timer. The power for the motor and rotating shaft may allow for movement along or in multiple axes and/or with 360 degrees of motion. Remote control options may include on/off, increase/decrease speed of motor (e.g., change the motor speed from 10 RPM, etc.), delay motion/stop and start intervals, etc. The remote control options are not required for proper function and thus may be added later if not originally provided.

Different types of materials, surface finishes, coating, and protectants may be used for the various components in exemplary embodiments. For example, a hard coating may be used for preventing or reducing wear and tear on the moving components and/or for surface protection from the environment. Examples materials that may be used for various components include aluminum (e.g., 6061, 2024, 7075, and/or 2011 aluminum, etc.), steel (e.g., 1018, 1117, and/or 12L14 aluminum, etc.), stainless steel (e.g., 302, 303, and/or 304 stainless steel, etc.), rubber, nylon, neoprene, 01 tool steel, 4140 alloy steel, 4142 alloy steel, etc. Examples coatings and protectants that may be used include an anodized material, black oxide, cad plate, zinc plate, alodine, nickel plate, moly paste lubricant, heat treated components, etc. By way of example only, a mechanical assembly or system for providing movement to a decoy may include hardened dowel pins, a nylon flat washer, a cable wire clamp, a rubber O-ring, rubber bumpers, a neoprene washer for arm pin shaft, a neoprene washer for motor shaft, heat shrinks for motor connections, steel screws (e.g., steel thumb screw with oxide coating, steel set screws, steel socket head cap screws, etc.), steel roll pin, a spring, steel snap rings (e.g., snap rings 125 in FIG. 1, snap rings 225 in FIG. 8, etc.), steel button head caps (e.g., caps 121 on the end portions of the vertical arms 123 in FIG. 1, caps 221 on the end portions of the horizontal arm 220 in FIG. 8, etc.), etc.

The inventor hereof recognized that the relative sizing (e.g., dimensions, etc.), shapes (e.g., contours, curved or contoured surfaces, flat surfaces, etc.), and relative positioning of the components influence the functioning of the mechanical assemblies or systems and motions produced thereby. After recognizing this, the inventor hereof developed and discloses herein mechanical assemblies or systems that are configured to produce realistic natural movement of decoys, where the mechanical assemblies or systems are modifiable and may be tailored based on the decoy type and motions desired. Example decoy types include male and female ducks, geese, turkeys, deer, dove, crow, etc. Example motion types that may be provided include feeding, looking/turning, mating, protecting, walking, socializing, content/resting, stretching, etc.

In exemplary embodiments, an animal decoy comprises a body and a mechanical assembly operable for moving the body of the animal decoy. The mechanical assembly may include a bottom mount, a top mount coupled to the bottom mount such that the top mount is rotatable relative to the bottom mount, a cam, a motor having a shaft coupled to the cam for rotating the cam, and a sweep arm coupled to the top mount, the bottom mount, and the cam. The sweep arm may be configured to cause the top mount to rotate relative to the bottom mount when the cam is being rotated by the motor. Rotation of the top mount relative to the bottom mount may rotate the body of the animal decoy relative to the bottom mount.

The mechanical assembly may be selectively configurable between at least a first configuration and a second configuration. In the first configuration, the mechanical assembly may be operable for providing the body of the animal decoy with a sweeping motion by rotating the body of the animal decoy in a first direction and then rotating the body of the animal decoy in a second direction opposite the first direction. In the second configuration, the mechanical assembly may be operable for providing the body of the animal decoy with the sweeping motion and also a peck feeding motion by pivoting the body of the animal decoy in a third direction and then pivoting the body of the animal in a fourth direction opposite the third direction.

There may be plurality of selectively interchangeable cams including a first cam and a second cam. The first cam may be circular without any cam lobes. The first cam may be used for the first configuration of the mechanical assembly in which the mechanical assembly is operable for providing the body of the animal decoy with only the sweeping motion. The second cam includes a plurality of spaced-apart cam lobes. The second cam may be used for the second configuration of the mechanical assembly in which the mechanical assembly is operable for providing the body of the animal decoy with the sweeping motion and the peck feeding motion.

The mechanical assembly may include a pivot shaft coupled to the top mount such that the pivot shaft is pivotable relative to the top mount. A wheel may be coupled to the pivot shaft and rollingly engaged with the cam. The wheel may be configured to follow and roll along a surface of the cam when the cam is being rotated by the motor. The body of the animal decoy may be coupled to the pivot shaft for common movement therewith. The cam may include a plurality of spaced-apart cam lobes. The wheel may be configured to follow and roll along the cam lobes when the cam is being rotated by the motor to thereby cause the pivot shaft to pivot relative to the top mount. Pivoting of the pivot shaft relative to the top mount may also pivot the body of the animal decoy.

There may be a plurality of interchangeable cams each having a different configuration such that the mechanical assembly is selectively configurable between different configurations in which the mechanical assembly is operable for providing different motions to the body of the animal decoy depending on which of the plurality of interchangeable cams is used. The plurality of interchangeable cams may include a first cam having four spaced-apart equally-sized cam lobes, a second cam having three spaced-apart cam lobes including a larger cam lobe that is larger than the other two cam lobes, a third cam having four spaced-apart cam lobes including a shorter cam lobe that is shorter than the other three cam lobes, and a fourth circular cam without any cam lobes. When the first cam is selectively used, the mechanical assembly may be operable for providing the body of the animal decoy with a sweeping motion by rotating the body of the animal decoy in a first direction and then rotating the body of the animal decoy in a second direction opposite the first direction, and a peck feeding motion by pivoting the body of the animal decoy in a third direction and then pivoting the body of the animal in a fourth direction opposite the third direction. When the second cam is selectively used, the mechanical assembly may be operable for providing the body of the animal decoy with the sweeping motion and the peck feeding motion including a much larger range of up-and-down pivoting motion when the wheel rolls along the larger cam lobe. When the third cam is selectively used, the mechanical assembly may be operable for providing the body of the animal decoy with the sweeping motion and the peck feeding motion during which a head of the animal decoy will stay down longer as the wheel rolls along the shorter cam lobe. When the fourth cam is selectively used, the mechanical assembly may be operable for providing the body of the animal decoy with only the sweeping motion.

One or more vertical arms may extend upwardly relative to the top mount. An attachment structure may be coupled to upper end portions of the one or more vertical arms. The attachment structure may comprise resiliently flexible cross members that are configured to be flexed inwardly towards each other to thereby decrease an overall size of the attachment structure for fitting through an opening in the body of the animal decoy. The resiliently flexible cross members may be configured to flex outwardly after being positioned through the opening to thereby contact an interior surface of the body of the animal decoy. An outward biasing force of the resiliently flexible cross members may help keep the body of the animal decoy expanded while in motion. A stake may be coupled to the bottom mount that is configured to be driven into the ground to support the body of the animal decoy above the ground. Rotation of the top mount relative to the bottom mount may rotate the body of the animal decoy relative to the ground when the stake is driven into the ground.

In exemplary embodiments, a system is operable for providing motion in an animal decoy. The system may comprise a bottom mount, a top mount coupled to the bottom mount such that the top mount is rotatable relative to the bottom mount, a cam, a motor having a shaft coupled to the cam for rotating the cam, and a sweep arm coupled to the top mount, the bottom mount, and the cam. The sweep arm may be configured to cause the top mount to rotate relative to the bottom mount when the cam is being rotated by the motor.

The system may further comprise a pivot shaft coupled to the top mount such that the pivot shaft is pivotable relative to the top mount, and a wheel coupled to the pivot shaft and rollingly engaged with the cam. The wheel may be configured to follow and roll along a surface of the cam when the cam is being rotated by the motor. One or more vertical arms may be coupled to the pivot shaft for common movement therewith. An attachment structure may be coupled to upper end portions of the one or more vertical arms. The attachment structure may comprise resiliently flexible cross members that are configured to be flexed inwardly towards each other to thereby decrease an overall size of the attachment structure for fitting through an opening in a body of an animal decoy. The resiliently flexible cross members may be configured to flex outwardly after being positioned through the opening to thereby contact an interior surface of the body of the animal decoy. An outward biasing force of the resiliently flexible cross members may help keep the body of the animal decoy expanded while in motion.

The wheel may be coupled to the pivot shaft by an arm. A sweep arm pin may be coupled to the cam for common movement therewith. The sweep arm pin may be engagingly received within a slot of the sweep arm. The arm pin may be operable as a pivot point for the sweep arm. A spring may be between an axle of the wheel and a lower portion of the top mount. The spring may be operable for helping the wheel maintain contact with the cam.

The cam may include a plurality of spaced-apart cam lobes including at least one cam lobe having a flat surface disposed between curved surfaces. The wheel may be configured to follow and roll along the cam lobes including the flat surface and curved surfaces of the at least one cam lobe when the cam is being rotated by the motor to thereby cause the pivot shaft to pivot relative to the top mount.

The system may further comprise a sweep block and a pair of sweep pins coupled to the sweep block and the bottom mount. An upper end portion of the sweep arm may be coupled to the top mount for common movement therewith. A lower end portion of the sweep arm is between the pair of sweep pins.

Also disclosed are exemplary methods related to providing motion to a body of an animal decoy. In an exemplary embodiment, a method may include selectively configuring a mechanical assembly into one of a plurality of configurations. The plurality of configurations may include a first configuration and a second configuration. In the first configuration, the mechanical assembly may be operable for providing the body of the animal decoy with a sweeping motion by rotating the body of the animal decoy in a first direction and then rotating the body of the animal decoy in a second direction opposite the first direction. In the second configuration, the mechanical assembly may be operable for providing the body of the animal decoy with the sweeping motion and also a peck feeding motion by pivoting the body of the animal decoy in a third direction and then pivoting the body of the animal in a fourth direction opposite the third direction.

To selectively configure the mechanical assembly, a cam may be selected for the mechanical assembly from a plurality of interchangeable cams. The interchangeable cams may have different configurations such that the mechanical assembly is operable for providing different motions to the body of the animal decoy depending on which of the plurality of interchangeable cams is used.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or component is referred to as being "on", "engaged to", "connected to", "attached to", or "coupled to" another element or layer, it may be directly on, engaged, connected or coupled to the other element or component, or one or more intervening elements or components may be present. In contrast, when an element or component is referred to as being "directly on," "directly engaged to", "directly connected to", "directly attached to", or "directly coupled to" another element or component, there may be no intervening elements or components present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances. For example, the tolerances may be +/−0.002 inches for dimensions provided to four decimal places (.XXXX), the tolerances may be +/−0.005 inches for dimensions provided to three decimal places (.XXX), and the tolerances may be +/−0.010 inches for dimensions provided to two decimal places (.XX). The angular tolerances may be +/−one-half (½) degree for angular dimensions. Whether or not modified by the term "about", the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An animal decoy comprising a body and a mechanical assembly operable for moving the body of the animal decoy, the mechanical assembly including:
    a bottom mount;
    a top mount coupled to the bottom mount such that the top mount is rotatable relative to the bottom mount;
    a cam;
    a motor having a shaft coupled to the cam for rotating the cam; and
    a sweep arm coupled to the top mount, the bottom mount, and the cam;
    whereby the sweep arm is configured to cause the top mount to rotate relative to the bottom mount when the cam is being rotated by the motor; and
    whereby rotation of the top mount relative to the bottom mount rotates the body of the animal decoy relative to the bottom mount.

2. The animal decoy of claim 1, wherein the mechanical assembly is selectively configurable between at least:
    a first configuration in which the mechanical assembly is operable for providing the body of the animal decoy with a sweeping motion by rotating the body of the animal decoy in a first direction and then rotating the body of the animal decoy in a second direction opposite the first direction; and
    a second configuration in which the mechanical assembly is operable for providing the body of the animal decoy with the sweeping motion and also a peck feeding motion by pivoting the body of the animal decoy in a third direction and then pivoting the body of the animal in a fourth direction opposite the third direction.

3. The animal decoy of claim 2, wherein the cam comprises a plurality of selectively interchangeable cams including:
    a first cam that is circular without any cam lobes for the first configuration of the mechanical assembly in which the mechanical assembly is operable for providing the body of the animal decoy with only the sweeping motion; and
    a second cam having a plurality of spaced-apart cam lobes for the second configuration of the mechanical assembly in which the mechanical assembly is operable for providing the body of the animal decoy with the sweeping motion and the peck feeding motion.

4. The animal decoy of claim 1, wherein the mechanical assembly includes:
    a pivot shaft coupled to the top mount such that the pivot shaft is pivotable relative to the top mount; and
    a wheel coupled to the pivot shaft and rollingly engaged with the cam;
    whereby the wheel is configured to follow and roll along a surface of the cam when the cam is being rotated by the motor.

5. The animal decoy of claim 4, wherein:
    the body of the animal decoy is coupled to the pivot shaft for common movement therewith;
    the cam includes a plurality of spaced-apart cam lobes;

whereby the wheel is configured to follow and roll along the cam lobes when the cam is being rotated by the motor to thereby cause the pivot shaft to pivot relative to the top mount; and whereby pivoting of the pivot shaft relative to the top mount pivots the body of the animal decoy.

6. The animal decoy of claim 4, wherein the cam comprises a plurality of interchangeable cams each having a different configuration such that the mechanical assembly is selectively configurable between different configurations in which the mechanical assembly is operable for providing different motions to the body of the animal decoy depending on which of the plurality of interchangeable cams is used.

7. The animal decoy of claim 6, wherein the plurality of interchangeable cams include:
a first cam having four spaced-apart equally-sized cam lobes;
a second cam having three spaced-apart cam lobes including a larger cam lobe that is larger than the other two cam lobes;
a third cam having four spaced-apart cam lobes including a shorter cam lobe that is shorter than the other three cam lobes; and
a fourth circular cam without any cam lobes.

8. The animal decoy of claim 7, wherein:
when the first cam is selectively used, the mechanical assembly is operable for providing the body of the animal decoy with a sweeping motion by rotating the body of the animal decoy in a first direction and then rotating the body of the animal decoy in a second direction opposite the first direction, and a peck feeding motion by pivoting the body of the animal decoy in a third direction and then pivoting the body of the animal in a fourth direction opposite the third direction;
when the second cam is selectively used, the mechanical assembly is operable for providing the body of the animal decoy with the sweeping motion and the peck feeding motion including a much larger range of up-and-down pivoting motion when the wheel rolls along the larger cam lobe;
when the third cam is selectively used, the mechanical assembly is operable for providing the body of the animal decoy with the sweeping motion and the peck feeding motion during which a head of the animal decoy will stay down longer as the wheel rolls along the shorter cam lobe; and
when the fourth cam is selectively used, the mechanical assembly is operable for providing the body of the animal decoy with only the sweeping motion.

9. The animal decoy of claim 1, wherein:
one or more vertical arms extend upwardly relative to the top mount; and
an attachment structure is coupled to upper end portions of the one or more vertical arms, the attachment structure comprising resiliently flexible cross members that are configured to be flexed inwardly towards each other to thereby decrease an overall size of the attachment structure for fitting through an opening in the body of the animal decoy;
the resiliently flexible cross members are configured to flex outwardly after being positioned through the opening to thereby contact an interior surface of the body of the animal decoy, whereby an outward biasing force of the resiliently flexible cross members may help keep the body of the animal decoy expanded while in motion.

10. The animal decoy of claim 1, further comprising a stake coupled to the bottom mount and configured to be driven into the ground to support the body of the animal decoy above the ground, whereby rotation of the top mount relative to the bottom mount rotates the body of the animal decoy relative to the ground when the stake is driven into the ground.

11. A system operable for providing motion in an animal decoy, the system comprising:
a bottom mount;
a top mount coupled to the bottom mount such that the top mount is rotatable relative to the bottom mount;
a cam;
a motor having a shaft coupled to the cam for rotating the cam; and
a sweep arm coupled to the top mount, the bottom mount, and the cam;
whereby the sweep arm is configured to cause the top mount to rotate relative to the bottom mount when the cam is being rotated by the motor.

12. The system of claim 11, further comprising:
a pivot shaft coupled to the top mount such that the pivot shaft is pivotable relative to the top mount; and
a wheel coupled to the pivot shaft and rollingly engaged with the cam.
whereby the wheel is configured to follow and roll along a surface of the cam when the cam is being rotated by the motor.

13. The system of claim 12, wherein:
one or more vertical arms are coupled to the pivot shaft for common movement therewith;
an attachment structure is coupled to upper end portions of the one or more vertical arms, the attachment structure comprising resiliently flexible cross members that are configured to be flexed inwardly towards each other to thereby decrease an overall size of the attachment structure for fitting through an opening in a body of an animal decoy; and
the resiliently flexible cross members are configured to flex outwardly after being positioned through the opening to thereby contact an interior surface of the body of the animal decoy, whereby an outward biasing force of the resiliently flexible cross members may help keep the body of the animal decoy expanded while in motion.

14. The system of claim 12, wherein:
the wheel is coupled to the pivot shaft by an arm;
a pin is coupled to the cam for common movement therewith, the pin engagingly received within a slot of the sweep arm, whereby the pin is operable as a pivot point for the sweep arm; and
a spring is between an axle of the wheel and a lower portion of the top mount, the spring operable for helping the wheel maintain contact with the cam.

15. The system of claim 12, wherein the cam includes a plurality of spaced-apart cam lobes including at least one cam lobe having a flat surface disposed between curved surfaces, whereby the wheel is configured to follow and roll along the cam lobes including the flat surface and curved surfaces of the at least one cam lobe when the cam is being rotated by the motor to thereby cause the pivot shaft to pivot relative to the top mount.

16. The system of claim 12, wherein the cam comprises a plurality of interchangeable cams each having a different configuration such that the system is selectively configurable between different configurations in which the system is operable for providing different motions to a body of an animal decoy depending on which of the plurality of interchangeable cams is used.

17. The system of claim 1, further comprising:
a sweep block;
a pair of sweep pins coupled to the sweep block and the bottom mount;
wherein:
the sweep arm includes opposite upper and lower end portions;
the upper end portion of the sweep arm is coupled to the top mount for common movement therewith; and
the lower end portion of the sweep arm is between the pair of sweep pins.

18. An animal decoy comprising the system of claim 17 and a body, whereby rotation of the top mount relative to the bottom mount rotates the body of the animal decoy relative to the bottom mount.

\* \* \* \* \*